US009790382B2

(12) United States Patent
Suzuki et al.

(10) Patent No.: US 9,790,382 B2
(45) Date of Patent: *Oct. 17, 2017

(54) MODELING MATERIAL FOR FORMING PHOTOFABRICATION MODEL IN INK-JET THREE DIMENSIONAL PRINTING, SUPPORTING MATERIAL FOR SUPPORTING THE SHAPE OF PHOTOFABRICATION MODEL ON PHOTOFABRICATION AND PRODUCTION METHOD OF PHOTOFABRICATION MODEL

(71) Applicant: Keyence Corporation, Osaka (JP)

(72) Inventors: Hideyuki Suzuki, Osaka (JP); Masatoshi Nakayama, Kyoto (JP)

(73) Assignee: Keyence Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,905

(22) Filed: May 26, 2016

(65) Prior Publication Data

US 2016/0263826 A1    Sep. 15, 2016

Related U.S. Application Data

(63) Continuation of application No. 13/868,157, filed on Apr. 23, 2013, now Pat. No. 9,556,346, which is a continuation of application No. PCT/JP2011/073778, filed on Oct. 17, 2011.

(30) Foreign Application Priority Data

Nov. 1, 2010   (JP) ................................ 2010-244909
Sep. 26, 2011  (JP) ................................ 2011-208389

(51) Int. Cl.
*C08F 2/46*      (2006.01)
*C08G 61/04*     (2006.01)
*C09D 11/101*    (2014.01)
*B29C 67/00*     (2017.01)
*C08F 220/10*    (2006.01)
*C08F 290/06*    (2006.01)
*C08L 33/26*     (2006.01)
*C08L 75/16*     (2006.01)
*B33Y 10/00*     (2015.01)
*B33Y 70/00*     (2015.01)
(Continued)

(52) U.S. Cl.
CPC ........ *C09D 11/101* (2013.01); *B29C 67/0059* (2013.01); *B29C 67/0092* (2013.01); *B29C 67/0096* (2013.01); *B33Y 10/00* (2014.12); *B33Y 70/00* (2014.12); *C08F 220/10* (2013.01); *C08F 290/067* (2013.01); *C08L 33/26* (2013.01); *C08L 75/16* (2013.01); *C09D 11/30* (2013.01); *B29K 2033/08* (2013.01); *B29K 2033/26* (2013.01); *B29K 2105/0005* (2013.01); *B29K 2105/005* (2013.01); *B29K 2995/007* (2013.01); *B29K 2995/0017* (2013.01); *B29K 2995/0081* (2013.01); *B29K 2995/0096* (2013.01); *B33Y 80/00* (2014.12)

(58) Field of Classification Search
CPC ............ B29C 67/0059; B29C 67/0096; B29C 67/0092; C09D 11/101; C09D 11/30; B33Y 10/00; B33Y 70/00; B33Y 80/00; C08L 5/16; C08L 33/26; B29K 2105/0005; B29K 2995/0096; B29K 2995/007; B29K 2033/26; B29K 2995/0081; B29K 2995/0017; B29K 2033/08; C08F 220/10; C08F 220/18; C08F 290/067
USPC ................................................... 522/1; 520/1
See application file for complete search history.

(56) References Cited

U.S. PATENT DOCUMENTS

2002/0008333 A1* 1/2002 Napadensky ....... B29C 67/0092
                                                     264/401
2004/0187714 A1* 9/2004 Napadensky ........... B29C 41/48
                                                      101/35
(Continued)

FOREIGN PATENT DOCUMENTS

EP    1274551 B1   10/2006
EP    1741545 A2    1/2007
(Continued)

OTHER PUBLICATIONS

Office Action issued in corresponding Japanese Patent Application No. 2015-117811 dated Apr. 25, 2016—English translation (4 pages).
Office Action issued in corresponding Japanese Patent Application No. 2015-117812 dated Apr. 25, 2016—English translation (5 pages).

*Primary Examiner* — Jessica E Whiteley
(74) *Attorney, Agent, or Firm* — Kilyk & Bowersox, P.L.L.C.

(57) ABSTRACT

The present invention aims to provide a supporting material for supporting the shape of a photofabrication model on photofabrication in ink-jet three dimensional printing method in which the photocured product is excellent in solubility in water and is easy to remove after photofabrication, and the like. A modeling material for forming a photofabrication model in ink-jet three dimensional printing method containing a curable resin component with a weighted average of SP value of 9.0 to 10.3; and a supporting material for supporting the shape of a photofabrication model on photofabrication in ink-jet three dimensional printing method containing a water-soluble monofunctional ethylenically unsaturated monomer (F), polyoxypropylene glycol with a number average molecular weight of 100 to 5,000 and/or water (G), and a photopolymerization initiator (D).

14 Claims, 6 Drawing Sheets

(51) Int. Cl.
*C09D 11/30* (2014.01)
*B29K 33/00* (2006.01)
*B29K 105/00* (2006.01)
*B33Y 80/00* (2015.01)

(56) References Cited

U.S. PATENT DOCUMENTS

2008/0138515 A1 6/2008 Williams
2013/0234370 A1* 9/2013 Suzuki ............... B29C 67/0059
                                                        264/401
2016/0264796 A1 9/2016 Suzuki et al.

FOREIGN PATENT DOCUMENTS

| JP | 01-204915 | 8/1989 |
| JP | 08-059760 | 3/1996 |
| JP | 09-169827 | 6/1997 |
| JP | 09-316111 | 12/1997 |
| JP | 2001-310918 | 11/2001 |
| JP | 2002-067174 | 3/2002 |
| JP | 2002-178412 | 6/2002 |
| JP | 2004-059601 | 2/2004 |
| JP | 2004-255839 | 9/2004 |
| JP | 2005-508404 | 3/2005 |
| JP | 2008-507619 | 3/2008 |
| JP | 2008-146685 | 6/2008 |
| JP | 2010-155889 | 7/2010 |
| JP | 2010-155926 | 7/2010 |
| JP | 2011-020412 | 2/2011 |

* cited by examiner

MODELING MATERIAL FOR FORMING PHOTOFABRICATION MODEL IN INK-JET THREE DIMENSIONAL PRINTING, SUPPORTING MATERIAL FOR SUPPORTING THE SHAPE OF PHOTOFABRICATION MODEL ON PHOTOFABRICATION AND PRODUCTION METHOD OF PHOTOFABRICATION MODEL

CROSS-REFERENCE TO RELATED APPLICATIONS

The present application is a continuation of U.S. patent application Ser. No. 13/868,157, filed Apr. 23, 2013, which in turn is a continuation of PCT/JP2011/073778, filed Oct. 17, 2011, which claims foreign priority based on Japanese Patent Application No. 2010-244909, filed Nov. 1, 2010 and Japanese Patent Application No. 2011-208389, filed Sep. 26, 2011, the contents of which is incorporated herein by reference.

TECHNICAL FIELD

The present invention relates to a modeling material for forming a photofabrication model in ink-jet three dimensional printing, a supporting material for supporting the shape of a photofabrication model on photofabrication, a two-pack photocurable resin composition for ink-jet three dimensional printing, a photofabrication model obtained by allowing the composition to be photocured, and a production method of a photofabrication model using the composition.

BACKGROUND ART

A method of irradiating a liquid photocurable resin with light such as a laser beam or ultraviolet rays to cure the resin in a given pattern and preparing a design model or a working model in three dimensions has been widely known, and various resins have been proposed as the liquid photocurable resin (see, for example, Patent Documents 1 to 6). In recent years, the three dimensional printing system employing an ink-jet method has been proposed, and compared with the conventional method, it has been made possible to cure the liquid photocurable resin discharged from an ink jet nozzle and to stack layers and carry out the photofabrication. The three dimensional printing device has advantages that, for example, a large tank for the liquid resin and provision of a dark room used in the conventional method are not necessary. It is made possible to allow a photofabrication apparatus to be compact and become smaller, and by employing a CAD (Computer Aided Design) system, the apparatus has been attracting attention as a 3-D CAD system capable of freely preparing a stereo model (see, for example, Patent Document 7).

Moreover, not limited to the three dimensional printing system employing an ink-jet method, a method of carrying out the photofabrication using a modeling material forming a photofabrication model and a supporting material supporting the shape of the photofabrication model on photofabrication has also been known in order to fabricate a photofabrication model having a complex shape (see, for example, Patent Documents 8 and 9). Furthermore, in the photofabrication employing an ink-jet method, a method of preparing a photofabrication model using a specific modeling material and a specific supporting material has also been proposed (see, for example, Patent Documents 10 to 13).

PRIOR ART DOCUMENT

Patent Document

Patent Document 1: Japanese Patent Laid-Open No. 1-204915
Patent Document 2: Japanese Patent Laid-Open No. 8-59760
Patent Document 3: Japanese Patent Laid-Open No. 9-169827
Patent Document 4: Japanese Patent Laid-Open No. 9-316111
Patent Document 5: Japanese Patent Laid-Open No. 2001-310918
Patent Document 6: Japanese Patent Laid-Open No. 2004-59601
Patent Document 7: Japanese Patent Laid-Open No. 2002-67174
Patent Document 8: Japanese Patent Laid-Open No. 2002-178412
Patent Document 9: Japanese Patent Laid-Open No. 2004-255839
Patent Document 10: EP Patent No. 1274551B1
Patent Document 11: EP Patent No. 1741545A2
Patent Document 12: Japanese Patent Laid-Open No. 2010-155889
Patent Document 13: Japanese Patent Laid-Open No. 2010-155926

SUMMARY OF THE INVENTION

Problems to be Solved by the Invention

However, in a method of irradiating a resin with a laser beam, ultraviolet rays or the like to carry out the photofabrication, although the resin is generally irradiated with a laser beam, ultraviolet rays or the like from the upper side or lower side of the liquid level of a liquid photocurable resin while moving the liquid level up and down to prepare a photofabrication model, in general, such an apparatus has not been widely prevailing and the number of apparatus installed has been restrictive because there are problems that it is necessary to provide a dedicated dark room since the liquid photocurable resin is cured also with light from outside and the like, only a portion of the liquid photocurable resin is used for the preparation of the photofabrication model, and further, the cost of equipment becomes very expensive since various incidental facilities are required for the photofabrication.

Moreover, with regard to the ink-jet method, the above-mentioned problems can be alleviated, but there is still a problem in the case where a photofabrication model with a complex shape is prepared. That is, in the method, although it is necessary to use a modeling material and a supporting material in combination, for example, in the methods disclosed in Patent Documents 10, 11, 13 and the like, the viscosity, the surface tension and the physical properties of a modeling material or a supporting material are taken into consideration, but there is a problem that the working accuracy cannot be maintained because a photofabrication model obtained by allowing a modeling material to be cured is deformed due to swelling on removing a supporting material by washing with water or the like after photofabrication.

Moreover, with regard to the supporting material, in the methods disclosed in Patent Documents 10 and 11, there are problems that it takes time to remove the supporting material, and it is difficult to remove the supporting material in all details because a crosslinked gel in which the supporting material basically forms a bond with a modeling material is formed. With regard to the supporting material disclosed in Patent Document 12, it is basically difficult to allow the supporting strength and the solubility in water to be compatible, and there are problems that it takes a lot of time to remove the supporting material after curing of a modeling material, and that the supporting strength cannot be maintained when reduction in the concentration of acrylamides with an acryloyl group and increase in the amount of a chain transfer agent are made. Furthermore, in the conventional technique described in the known document, no consideration is paid to a problem that on discharging a modeling material and a supporting material by an ink-jet method, both intermix by the end of curing and the intermixed part is deformed due to expansion when, for example, the photofabrication model is immersed in water.

Means for Solving the Problems

As a result of extensive researches for solving the above-mentioned problems, the present inventors have reached the present invention. That is, the present invention is directed to a modeling material for forming a photofabrication model in ink-jet three dimensional printing system containing a curable resin component with a weighted average of SP value of 9.0 to 10.3; a supporting material for supporting the shape of a photofabrication model on photofabrication in ink-jet three dimensional printing system containing a water-soluble monofunctional ethylenically unsaturated monomer (F), an alkylene oxide adduct containing an oxypropylene group and/or water (G), and a photopolymerization initiator (D); a two-pack photocurable resin composition for ink-jet three dimensional printing system including a combination of a modeling material for forming a photofabrication model in ink-jet three dimensional printing system and a supporting material for supporting the shape of the photofabrication model on photofabrication including the above-mentioned modeling material as the modeling material and the above-mentioned supporting material as the supporting material; a photofabrication model obtained by allowing the above-mentioned composition to be photo-cured by ink-jet three dimensional printing system; and a production method of a photofabrication model by ink-jet three dimensional printing system including the step of producing the above-mentioned composition with a photofabrication apparatus.

Effects of the Invention

The modeling material, the supporting material, the two-pack photocurable resin composition, the photofabrication model prepared from the composition and the production method thereof according to the present invention produce the following effects. (1) There is very little swelling deformation of the modeling material due to water or moisture absorption on photocuring and after curing. (2) The photo-cured product of the supporting material is excellent in solubility in water and it is easy to remove the product after photofabrication. (3) With regard to the two-pack photocurable resin composition, the supporting material is not compatible with the modeling material and the photofabrication model has excellent mechanical properties. (4) The photofabrication model prepared from the two-pack photocurable resin composition is excellent in working accuracy. (5) The production method of the photofabrication model is excellent in productivity.

MODES FOR CARRYING OUT THE INVENTION

Figure 1:
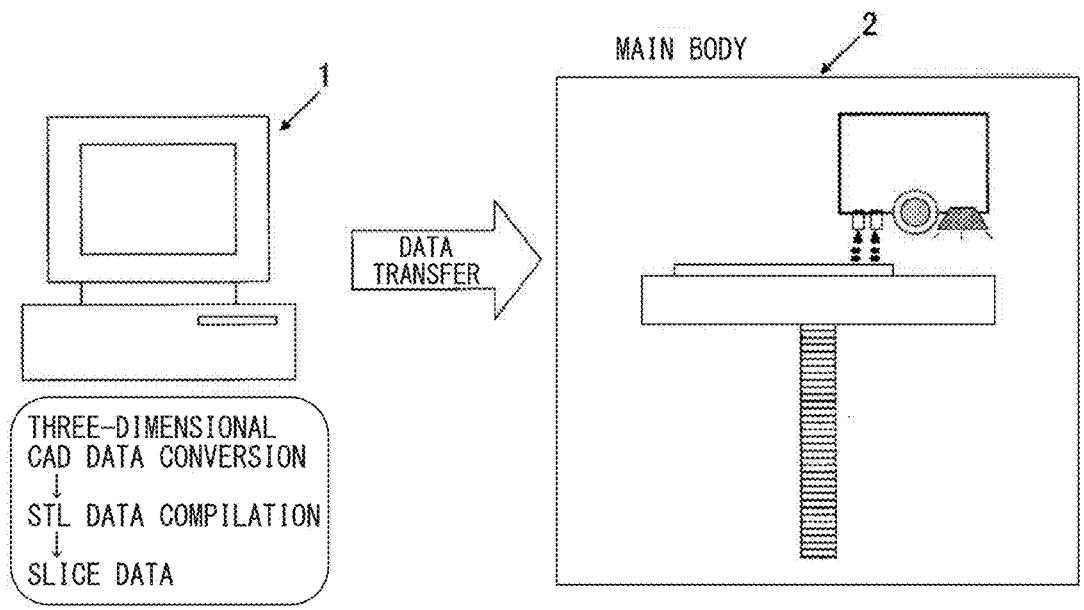
FIG. 1 is a schematic view of a three-dimensional modeling system employing an ink-jet method.

The modeling material for forming a photofabrication model in ink-jet three dimensional printing device according to the present invention is characterized as being a modeling material containing curable resin ingredients (A) to (C) with a weighted average of SP value of 9.0 to 10.3. [Modeling material] The weighted average of SP value (hereinafter, sometimes referred to simply as the SP value) of the curable resin ingredients (A) to (C) in the modeling material according to the present invention is 9.0 to 10.3, preferably 9.2 to 10.0. When the SP value exceeds 10.3, the cured product of the modeling material is deformed due to swelling with water in the case where it is immersed in water or washed by water jet in order to remove the cured product of the supporting material described later and the deformation is not resolved even after drying. If the cured product of the modeling material is allowed to stand, it absorbs moisture and is apt to be deformed. Moreover, when the SP value is less than 9.0, the cured product becomes brittle and the toughness is lowered. The SP value of the curable resin component in the modeling material may be adjusted so as to fall in the above-mentioned range by selecting the kind and content of the curable resin ingredients (A) to (C) which are described later and constituting the modeling material.

In this context, the SP means the solubility parameter and serves as a rough indication for mutual solubility of materials. It is known that the smaller the difference of SP value between the materials is, the greater the mutual solubility is. The SP value is determined by the following equation.

$$SP=[(\Delta H-RT)/V]^{1/2}$$

In the equation, V: molar volume (cc/mol), $\Delta H$: latent heat of vaporization (cal/mol), and R: gas constant 1.987 cal/mol·K.

The SP value of a copolymer or a blend is calculated by the method which is proposed by Fedors, et al. and described in the following document. With regard to the SP value of a copolymer or a blend, by assuming that the additivity rule holds in the method, the SP value of a copolymer and the SP value of a blend are calculated as the weighted average of SP value by proportionally allotting the SP values of constituent monomers and the SP values of constituent ingredients, respectively on the basis of each constituent proportion (% by weight).

"POLYMER ENGINEERING AND SCIENCE, FEBRUARY, 1974, Vol. 14, No. 2, Robert F. Fedors, pp. 147-154"

With regard to the modeling material according to the present invention, the curable resin component contains a monofunctional ethylenically unsaturated monomer (A), a polyfunctional ethylenically unsaturated monomer containing no urethane group (B), a urethane group-containing ethylenically unsaturated monomer (C) and a photopolymerization initiator (D). In this context, the modeling material is designed so that the weighted average of the SP values of the curable resin ingredients in the modeling material, namely, (A) to (C), is 9.0 to 10.3.

[Monofunctional Ethylenically Unsaturated Monomer (A)]

Although the monofunctional ethylenically unsaturated monomer (A) is not particularly limited as long as it is a compound with an ethylenically unsaturated group [a (meth) acryloyl group, an N-vinyl group or the like], from the viewpoint of making the SP value small, preferred is a hydrophobic monofunctional ethylenically unsaturated monomer (A1) (the SP value is not more than 10).

Examples of (A1) include linear or branched alkyl(meth) acrylates [a compound with 4 to 30 carbon atoms (hereinafter, abbreviated as C) such as methyl(meth)acrylate, ethyl (meth)acrylate, isobutyl(meth)acrylate, lauryl(meth) acrylate, stearyl(meth)acrylate, isostearyl(meth)acrylate and t-butyl(meth)acrylate]; alicyclic(meth)acrylates [a C6 to C20 compound such as cyclohexyl(meth)acrylate, 4-t-cyclohexyl(meth)acrylate, isobornyl(meth)acrylate and dicyclopentanyl(meth)acrylate]; and heterocyclic(meth)acrylates [a C5 to C20 compound such as tetrahydrofurfuryl (meth)acrylate, 4-(meth)acryloyloxymethyl-2-methyl-2-ethyl-1,3-dioxolane, 4-(meth)acryloyloxymethyl-2-cyclohexyl-1,3-dioxolane and adamantyl(meth)acrylate].

Among the above-mentioned examples of (A1), from the viewpoint of enhancing the working accuracy enough to stand the forming temperature (50 to 90° C.) on curing of the modeling material and the viewpoint of heat resistance of the photofabrication model itself to the operating temperature, further preferred are those that give the homopolymer thereof a high (50° C. or more) glass transition point (hereinafter, abbreviated as Tg), namely, methyl(meth)acrylate, ethyl(meth)acrylate and stearyl(meth)acrylate among alkyl(meth)acrylates, isobornyl(meth)acrylate and dicyclopentanyl(meth)acrylate among alicyclic(meth)acrylates, and adamantyl(meth)acrylate. Among these, from the viewpoint of photoreactivity, especially preferred are highly reactive acrylates, namely, isobornyl acrylate and dicyclopentanyl acrylate among alicyclic acrylates, and adamantyl acrylate.

In the case where the modeling material can be designed so that the weighted average of the SP values of the curable resin ingredients in the modeling material, namely, (A) to (C), is not more than 10.3, a water-soluble monofunctional ethylenic unsaturated monomer (A2) may be incorporated as (A). In the present invention, "water-soluble" means that the solubility in water (25° C.) is not less than 1 (g/100 g of water).

Examples of (A2) include hydroxyl group-containing C5 to C15 (meth)acrylates [hydroxyethyl(meth)acrylate, hydroxypropyl(meth)acrylate, 4-hydroxybutyl(meth)acrylate and the like]; hydroxyl group-containing (meth)acrylates with a number average molecular weight [hereinafter, abbreviated as Mn, measured by a gel permeation chromatography (GPC) method] of 200 to 2,000 [polyethylene glycol (hereinafter, abbreviated as PEG) mono(meth)acrylate, methoxypolyethylene glycol mono(meth)acrylate, polypropylene glycol (hereinafter, abbreviated as PPG) mono(meth)acrylate, methoxypolypropylene glycol mono (meth)acrylate, mono(meth)acrylate of PEG-PPG block polymer and the like]; C3 to C15 (meth)acrylamide derivatives [(meth)acrylamide, N-methyl(meth)acrylamide, N-ethyl(meth)acrylamide, N-propyl(meth)acrylamide, N-butyl(meth)acrylamide, N, N'-dimethyl(meth)acrylamide, N,N'-diethyl(meth)acrylamide, N-hydroxyethyl(meth)acrylamide, N-hydroxypropyl(meth)acrylamide, N-hydroxybutyl (meth)acrylamide and the like], acryloyl morpholine and the like.

The content of (A2) is usually not more than 10% on the basis of the weight of the modeling material, and from the viewpoint of reduction in water-swelling ratio of a photocured product of the modeling material described later, preferably not more than 5%, further preferably not more than 3% and most preferably 0%. The above-mentioned examples of the monofunctional ethylenically unsaturated monomer (A) may be used alone or in combination of two or more thereof if necessary.

[Polyfunctional Ethylenically Unsaturated Monomer Having No Urethane Group (B)]

The polyfunctional ethylenically unsaturated monomer having no urethane group (B) is not particularly limited as long as it is a compound having no urethane group and having two or more ethylenically unsaturated groups. By allowing (B) to be incorporated into the modeling material, it is made possible to enhance the mechanical strength and elastic modulus of the cured product.

Although (B) is not particularly limited as long as it is a monomer having two or more (preferably 2 to 3) ethylenically unsaturated groups in the molecule, from the viewpoint of making the SP value small, preferred is a hydrophobic polyfunctional ethylenically unsaturated monomer having no urethane group (B1) (the SP value is not more than 10).

Examples of (B1) include linear or branched alkylene glycol di(meth)acrylates [a C10 to C25 compound such as 1,6-hexanediol di(meth)acrylate, neopentylglycol di(meth) acrylate, 1,9-nonanediol di(meth)acrylate, 3-methyl-1,5-pentanediol di(meth)acrylate, 2-n-butyl-2-ethyl-1,3-propanediol di(meth)acrylate] and alicyclic di(meth)acrylates [a C10 to C30 compound such as dimethyloltricyclodecane di(meth)acrylate].

Among the above-mentioned examples of (B1), from the viewpoint of enhancing the working accuracy enough to stand the forming temperature (50 to 90° C.) on curing of the modeling material and the viewpoint of heat resistance of the photofabrication model itself to the operating temperature, further preferred are those that give the homopolymer thereof a high (50° C. or more) glass transition point, namely, neopentylglycol di(meth)acrylate and 3-methyl-1, 5-pentanediol di(meth)acrylate among branched alkylene glycol di(meth)acrylates, and dimethyloltricyclodecane di(meth)acrylate among alicyclic di(meth)acrylates. Among these, from the viewpoint of photoreactivity, especially preferred are highly reactive acrylates, namely, neopentylglycol diacrylate, 3-methyl-1,5-pentanediol diacrylate and dimethyloltricyclodecane diacrylate. The above-mentioned examples of the polyfunctional ethylenically unsaturated monomer having no urethane group (B) may be used alone or in combination of two or more thereof if necessary.

[Urethane Group-Containing Ethylenically Unsaturated Monomer (C)]

The urethane group-containing ethylenically unsaturated monomer (C) is a monomer having one or more ethylenically unsaturated groups and containing a urethane group. By allowing (C) to be incorporated into the modeling material, it is made possible to give the cured product toughness and to adjust the toughness and elongation of the cured product. Examples of (C) include a monomer formed from a compound having a hydroxyl group and a (meth) acryloyl group (a) and a polyisocyanate (b), and from the viewpoint of making the SP value small, preferred is a monomer being hydrophobic (the SP value is not more than 10.9) (C1).

Examples of (a) include C5 or more compounds with an Mn of 5,000 or less such as the following compounds, and a mixture of two or more kinds thereof. (a1): an alkylene oxide (hereinafter, abbreviated as AO) adduct of (meth) acrylic acid (alkylene in AO has 2 to 4 carbon atoms) such as (meth)acrylic acid 2-hydroxyethyl ester, (meth)acrylic acid 2-hydroxypropyl ester, (meth)acrylic acid 2-hydroxybutyl ester, and an additional AO adduct thereof (molecular weight: 160 or more, Mn: 5,000 or less); (a2): an ε-caprolactone adduct of (a1) (molecular weight: 230 or more, Mn: 5,000 or less) such as a (meth)acrylic acid 2-hydroxyethyl-ε-caprolactone 2-mole adduct; (a3): a reaction product of (meth)acrylic acid and a diol (Mn: 300 to 5,000) such as mono(meth)acrylate of a diol [Mn: 300 to 5,000, e.g. polycarbonate diol, PEG, polyester diol and the like];
(a4): a reaction product of (meth)acrylic acid and an epoxide (C8 to C30) such as 3-phenoxy-2-hydroxypropyl(meth) acrylate and 3-biphenoxy-2-hydroxypropyl(meth)acrylate; (a5): a reaction product of (meth)acrylic acid and a 3 or more functional polyol (molecular weight: 92 or more, Mn: 5,000 or less) such as glycerin mono- and di(meth)acrylate, trimethylolpropane mono- and di(meth)acrylate, pentaerythritol mono-, di- and tri(meth)acrylate, ditrimethylolpropane mono-, di- and tri(meth)acrylate, dipentaerythritol mono-, di-, tri-, tetra- and penta(meth)acrylate, and an AO adduct thereof (number of moles added: 1 to 100); and among these examples of (a), from the viewpoint of toughness, preferred are (a1) and (a2).

Examples of the poly (di, tri or more) isocyanate (b) include aromatic polyisocyanates [a C (excluding C in the NCO group, the same holds true for description below) 6 to C20 compound such as 2,4- and/or 2,6-tolylene diisocyanate (TDI) and 4,4'- and/or 2,4'-diphenylmethane diisocyanate (MDI)], aliphatic polyisocyanates [a C2 to C18 compound such as hexamethylene diisocyanate (HDI)], alicyclic polyisocyanates [a C4 to C45 compound such as isophorone diisocyanate (IPDI), 2,4- and/or 2,6-methykyclohexane diisocyanate (hydrogenated TDI) and dicyclohexylmethane-4,4'-diisocyanate (hydrogenated MDI)], aromatic-aliphatic polyisocyanates [a C8 to C15 compound such as m- and/or p-xylylene diisocyanate (XDI) and α,α,α',α'-tetramethylxylylene diisocyanate (TMXDI)], a nurate thereof, and a mixture thereof.

In the case where the urethane group-containing ethylenically unsaturated monomer (C) is produced, from the viewpoints of toughness and elongation of the cured product, an ingredient (f) having a hydroxyl group and no unsaturated group other than (a) may be incorporated as a reactive ingredient. Examples of (f) include C1 or more polyhydric alcohols with an Mn of 3,000 or less (ethylene glycol, propylene glycol, glycerin, polyalkylene glycol and the like) and monohydric alcohols (methanol, ethanol and the like). Among these, from the viewpoint of impact resistance of the cured product, preferred are monohydric alcohols.

With regard to the Mn of (C), the lower limit is preferably 500, further preferably 700 from the viewpoint of impact resistance of the cured product, and the upper limit is preferably 5,000, further preferably 2,000 from the viewpoints of ease of handling of the composition and working accuracy of the cured product.

The number of functional groups of the ethylenically unsaturated group in (C) is preferably 1 to 20, further preferably 1 to 3 from the viewpoints of hardness and impact resistance of the cured product.

[Photopolymerization Initiator (D)]

Examples of the photopolymerization initiator (D) include benzoin compounds [a C14 to C18 compound such as benzoin, benzoin methyl ether, benzoin ethyl ether, benzoin propyl ether and benzoin isobutyl ether]; acetophenone compounds [a C8 to C18 compound such as acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexylphenyl ketone and 2-methyl-1-[4-(methylthio)phenyl]-2-morpholinopropan-1-one]; anthraquinone compounds [a C14 to C19 compound such as 2-ethylanthraquinone, 2-t-butylanthraquinone, 2-chloroanthraquinone and 2-amylanthraquinone]; thioxanthone compounds [a C13 to C17 compound such as 2,4-diethylthioxanthone, 2-isopropylthioxanthone and 2-chlorothioxanthone]; ketal compounds [a C16 to C17 compound such as acetophenone dimethyl ketal and benzil dimethyl ketal]; benzophenone compounds [a C13 to C21 compound such as benzophenone, 4-benzoyl-4'-methyldiphenyl sulfide and 4,4'-bismethylaminobenzophenone]; phosphine oxide compounds [a C22 to C28 compound such as 2,4,6-trimethylbenzoyldiphenylphosphine oxide, bis-(2, 6-dimethoxybenzoyl)-2,4,4-trimethylpentylphosphine oxide and bis(2,4,6-trimethylbenzoyl)-phenylphosphine oxide]; a mixture thereof and the like. These examples of (D) may be used alone or in combination of two or more thereof.

Among the above-mentioned examples of (D), from the viewpoint of light resistance such that the cured product is less apt to turn yellow, preferred are acetophenone compounds and phosphine oxides, further preferred are 1-hydroxycyclohexylphenyl ketone, 2-methyl-1-[4-(methylthio) phenyl]-2-morpholino-propan-1-one, 2,4,6-trimethylbenzoyldiphenylphosphine oxide and bis-(2,6-dimethoxybenzoyl)-2,4,4-trimethylpentylphosphine oxide, and especially preferred are 1-hydroxycyclohexylphenyl ketone and 2,4,6-trimethylbenzoyldiphenylphosphine oxide.

The contents (% by weight) of (A) to (D) in the modeling material are preferably 50 to 90%, further preferably 55 to 85% of (A) from the viewpoints of enhancement in Tg and brittleness resistance of the photocured product; preferably 3 to 25%, further preferably 4 to 20% of (B) from the viewpoints of mechanical strength and brittleness resistance of the photocured product; preferably 5 to 35%, further preferably 8 to 30% of (C) from the viewpoints of toughness and hardness of the photocured product; and preferably 0.1 to 10%, further preferably 0.3 to 8% of (D) from the viewpoints of photocuring rate and mechanical properties of the photocured product.

[Other Additive Agents (E)]

Other additive agents (E) may be incorporated into the modeling material if necessary as long as the effect of the present invention is not impaired. Examples of (E) include a polymerization inhibitor, a surfactant, a coloring agent, an oxidation inhibitor, a chain transfer agent, a filler and the like. Various additive agents may be selected according to the purpose and may be used alone or in combination of two or more thereof.

In a production method of a photofabrication model by ink-jet three dimensional printing system according to the present invention described later, although the forming temperature varies with the ink-jet method, the temperature is about 50 to 90° C. in many instances and it is preferred to employ a polymerization inhibitor from the viewpoints of avoidance of the runaway polymerization and enhancement in stability of the monomer in the apparatus.

Examples of the polymerization inhibitor include phenol compounds [hydroquinone, hydroquinone monomethyl ether, 2,6-di-t-butyl-p-cresol, 2,2-methylene-bis-(4-methyl-6-t-butylphenol), 1,1,3-tris-(2-methyl-4-hydroxy-5-t-butylphenyl)butane and the like], sulfur compounds [dilauryl thiodipropionate and the like], phosphorus compounds [triphenyl phosphite and the like], amine compounds [phenothiazine and the like] and the like. The amount of the polymerization inhibitor used is usually not more than 5%, and is preferably 0.1 to 3% from the viewpoints of stability and polymerization rate of the monomer, on the basis of the total weight of (A) to (D).

Examples of the surfactant include an agent with a molecular weight of 264 or more and an Mn of 5,000 or less such as a PEG-based nonionic surfactant [a 1- to 40-mol ethylene oxide (hereinafter, abbreviated as EO) adduct of nonylphenol, a 1- to 40-mol EO adduct of stearic acid and the like], a polyhydric alcohol-based nonionic surfactant (sorbitan palmitic acid monoester, sorbitan stearic acid monoester, sorbitan stearic acid triester and the like), a fluorine-containing surfactant (a 1- to 50-mol perfluoroalkyl EO adduct, perfluoroalkyl carboxylate, perfluoroalkyl betaine and the like), and a modified silicone oil [a polyether modified silicone oil, a (meth)acrylate modified silicone oil and the like]. The amount of the surfactant used is usually not more than 3%, and is preferably 0.1 to 2% from the viewpoints of addition effects and physical properties of the photocured product, on the basis of the total weight of (A) to (D).

Examples of the coloring agent include a pigment and/or a dye. Examples of the pigment include organic and inorganic pigments and the following agents can be mentioned as examples. (1) an azo pigment such as an insoluble monoazo pigment (toluidine red, permanent carmine FB, fast yellow G and the like), an insoluble disazo pigment (disazo yellow AAA, disazo orange PMP and the like), an azo lake (a soluble azo pigment) (lake red C, brilliant carmine 6B and the like), a condensed azo pigment and a chelate azo pigment; (2) a polycyclic pigment such as phthalocyanine blue, indanthrone blue, quinacridone red and dioxazine violet; (3) a dye lake such as a basic dye (victoria pure blue BO lake and the like) and an acid dye (alkali blue toner and the like); and (4) others such as an azine pigment (aniline black and the like), a daylight fluorescent pigment, a nitroso pigment, a nitro pigment and a natural pigment.

Examples of the inorganic pigment include the following (1) and (2): (1) a metal oxide (iron oxide, chromium oxide, titanium oxide and the like); and (2) carbon black.

The amount of the coloring agent used is usually not more than 2%, and is preferably 0.1 to 1% from the viewpoints of coloration effects and physical properties of the photocured product, on the basis of the total weight of (A) to (D).

Examples of the oxidation inhibitor include phenol compounds {monocyclic phenols (2,6-di-t-butyl-p-cresol and the like), bisphenols [2,2'-methylenebis(4-methyl-6-t-butylphenol) and the like], polycyclic phenols [1,3,5-trimethyl-2,4,6-tris(3,5-di-t-butyl-4-hydroxybenzyl)benzene and the like] and the like}, sulfur compounds (dilauryl 3,3'-thiodipropionate and the like), phosphorus compounds (triphenyl phosphite and the like) and amine compounds (octylated diphenylamine and the like). The amount of the oxidation inhibitor used is usually not more than 3%, and is preferably 0.1 to 2% from the viewpoints of antioxidant effects and physical properties of the photocured product, on the basis of the total weight of (A) to (D).

Examples of the chain transfer agent include hydrocarbons [a C6 to C24 compound such as an aromatic hydrocarbon (toluene, xylene and the like) and an unsaturated aliphatic hydrocarbon (1-butene, 1-nonene and the like)]; halogenated hydrocarbons (a C1 to C24 compound such as dichloromethane and carbon tetrachloride); alcohols (a C1 to C24 compound such as methanol and 1-butanol); thiols (a C1 to C24 compound such as ethylthiol and 1-octylthiol); ketones (a C3 to C24 compound such as acetone and methyl ethyl ketone); aldehydes (a C2 to C18 compound such as 2-methyl-2-propyl aldehyde and 1-pentyl aldehyde); phenols (a C6 to C36 compound such as phenol and m-, p- and o-cresol); quinones (a C6 to C24 compound such as hydroquinone); amines (a C3 to C24 compound such as diethylmethylamine and diphenylamine); and disulfides (a C2 to C24 compound such as diethyl disulfide and di-1-octyl disulfide). The amount of the chain transfer agent used is usually not more than 10%, and is preferably 0.05 to 5% from the viewpoints of polymerizability of the monomer and compatibility of the monomer and the chain transfer agent, on the basis of the total weight of (A) to (D).

Examples of the filler include metal powders (aluminum powder, copper powder and the like), metal oxides (alumina, silica, talc, mica, clay and the like), metal hydroxides (aluminum hydroxide and the like), metal salts (calcium carbonate, calcium silicate and the like), fibers [inorganic fibers (carbon fibers, glass fibers, asbestos and the like), organic fibers (cotton, nylon, acrylic, rayon fibers and the like) and the like], microballoon (glass, shirasu, phenolic resin and the like), carbon (carbon black, graphite, coal powder and the like), metal sulfides (molybdenum disulfide and the like), and organic powders (wood dust and the like). The amount of the filler used is usually not more than 30%, and is preferably 3 to 20% from the viewpoints of packing effects, viscosity that allows ink-jet discharge and physical properties of the photocured product, on the basis of the total weight of (A) to (D).

The total amount of (E) used is usually not more than 30%, and is preferably 0.05 to 20% from the viewpoints of addition effects and physical properties of the photocured product, on the basis of the total weight of (A) to (D).

[Water-Soluble Component in Modeling Material]

The content of a water-soluble component in the modeling material is preferably 10% by weight or less, further preferably 5% by weight or less from the viewpoint of preventing the swelling deformation due to water and the deformation due to moisture absorption of the photocured product. It should be noted that in this context, the water-soluble component refers to a component with the above defined solubility in water of 1 (g/100 g of water) or more and a component that exhibits the solubility among (A) to (D) constituting the modeling material and (E) added if necessary.

[Tg of Photocured Product of Modeling Material]

In the three dimensional printing system employing an ink-jet method, since the photofabrication is carried out usually at 50 to 90° C., the Tg of a photocured product of the modeling material is preferably 50 to 120° C., further preferably 55 to 110° C., especially preferably 60 to 100° C. from the viewpoints of heat resistance of the photocured product and reducing the warpage of the photofabrication model. In this context, the Tg of a photocured product is a value evaluated by the method described later. The Tg may be adjusted so as to fall in the above-mentioned range by selecting the kind and content of each of the ingredients (A) to (D) constituting the modeling material.

[Water-Swelling Ratio of Photocured Product of Modeling Material]

The water-swelling ratio of the photocured product of the modeling material (% by weight) is preferably not more than 1%, further preferably not more than 0.7%, especially preferably not more than 0.5% from the viewpoint of photofabrication accuracy. In this context, the water-swelling ratio of the photocured product is a value evaluated by the method described later. The water-swelling ratio may be adjusted so as to fall in the above-mentioned range by selecting the kind and content of each of the ingredients (A) to (D) constituting the modeling material.

[Swelling Deformation Due to Water of Photocured Product of Modeling Material]

The swelling deformation due to water of the photocured product of the modeling material (mm) is preferably not more than 2 mm, further preferably not more than 1 mm, especially preferably not more than 0.5 mm from the viewpoint of photofabrication accuracy. In this context, the swelling deformation due to water is a value evaluated by the method described later. The swelling deformation due to water may be adjusted so as to fall in the above-mentioned range by selecting the kind and content of each of the ingredients (A) to (D) constituting the modeling material.

The modeling material according to the present invention is used as the modeling material employed for a two-pack photocurable resin composition including a combination of a modeling material for forming a photofabrication model in ink-jet three dimensional printing system and a supporting material for supporting the shape of the photofabrication model on photofabrication. Although known supporting materials may be used as the supporting material combinedly used in the two-pack photocurable resin composition, it is preferred to use the following supporting material according to the present invention from the viewpoints of ease of removal after photofabrication due to excellent solubility in water of the photocured product and excellent working accuracy and mechanical properties of the photofabrication model due to incompatibility with the modeling material.

[Supporting Material]

The supporting material according to the present invention contains a water-soluble monofunctional ethylenically unsaturated monomer (F), an alkylene oxide adduct containing an oxypropylene group and/or water (G), and a photopolymerization initiator (D).

[Water-Soluble Monofunctional Ethylenically Unsaturated Monomer (F)]

The water-soluble monofunctional ethylenically unsaturated monomer (F) is employed as a constituent ingredient of the supporting material in order to allow the cured product of the supporting material to dissolve rapidly in water after photofabrication.

Although a water-soluble polyfunctional ethylenically unsaturated monomer (H) in (F) may be produced as a by-product during the production process of (F), the content thereof is preferably not more than 1%, further preferably not more than 0.5%, especially preferably 0% from the viewpoint of water-solubility of the homopolymer of (F) after polymerization.

Examples of (F) include C5 to C15 hydroxyl group-containing (meth)acrylates [hydroxyethyl(meth)acrylate, hydroxypropyl(meth)acrylate, 4-hydroxybutyl(meth)acrylate and the like]; hydroxyl group-containing (meth)acrylates with an Mn of 200 to 1,000 [polyethylene glycol mono(meth)acrylate, monoalkoxy (C1 to C4) polyethylene glycol mono(meth)acrylate, polypropylene glycol mono(meth)acrylate, monoalkoxy (C1 to C4) polypropylene glycol mono(meth)acrylate, mono(meth)acrylate of PEG-PPG block polymer and the like]; C3 to C15 (meth)acrylamide derivatives [(meth)acrylamide, N-methyl(meth)acrylamide, N-ethyl(meth)acrylamide, N-propyl(meth)acrylamide, N-butyl(meth)acrylamide, N,N'-dimethyl(meth)acrylamide, N,N'-diethyl(meth)acrylamide, N-hydroxyethyl(meth)acrylamide, N-hydroxypropyl(meth)acrylamide, N-hydroxybutyl (meth)acrylamide and the like]; (meth)acryloyl morpholine and the like. These examples may be used alone or in combination of two or more thereof.

Examples of the water-soluble polyfunctional ethylenically unsaturated monomer (H) include polyethylene glycol di(meth)acrylate, polypropylene glycol di(meth)acrylate and di(meth)acrylate of PEG-PPG block polymer.

Among the above-mentioned examples of (F), from the viewpoint of photoreactivity, preferred are acrylates and acrylamide derivatives, further preferred are hydroxyethyl acrylate, hydroxypropyl acrylate and 4-hydroxybutyl acrylate, acrylamide, acryloyl morpholine, N-methyl acrylamide, N-ethyl acrylamide, N-propyl acrylamide, N-butyl acrylamide, N,N'-dimethyl acrylamide, N,N'-diethyl acrylamide, N-hydroxyethyl-, N-hydroxypropyl- and N-hydroxybutyl acrylamide. Moreover, from the viewpoint of low stimulative effect on the skin of the human body, preferred are acryloyl morpholine and N-hydroxyethyl acrylamide.

[Alkylene Oxide Adduct Containing Oxypropylene Group and/or Water (G)]

Examples of (G) include an alkylene oxide adduct containing an oxypropylene group and an adduct obtained by subjecting an active hydrogen compound to an addition reaction of at least propylene oxide alone or of propylene oxide and any other alkylene oxide. Among these, preferred is a homoadduct of propylene oxide (polyoxypropylene glycol). Examples of the active hydrogen compound include mono- to tetrahydric alcohols and amine compounds, and among these, preferred are dihydric alcohols and water.

Examples of (G) include polyoxypropylene glycol which is compatible with (F) before curing and is not compatible with the photocured product of (F) and having a number average molecular weight of 100 to 5,000 and/or water from the viewpoint of allowing the supporting strength and solubility in water of the cured product of the supporting material to be compatible. The number average molecular weight of polyoxypropylene glycol is preferably 200 to 3,000, more preferably 400 to 2,000.

On the other hand, from the viewpoint of prevention of compatibilization or prevention of intermixing of the modeling material and the supporting material before curing, preferred is water. In the case where (G) is water, since the modeling material and the supporting material before curing do not compatibilize or intermix with each other, a problem of decreased various physical properties at an intermixed part of each of the modeling material and the supporting material and a problem of swelling deformation, resulting from the problem of compatibilization and intermixing of the modeling material and the supporting material before curing, may be completely solved.

[Photopolymerization Initiator (D)]

As a photopolymerization initiator used for the supporting material, one that is the same as the photopolymerization initiator (D) for the modeling material is basically used. In the case where (G) is water, a water-soluble photopolymerization initiator is used. Among the examples of (D), as the water-soluble photopolymerization initiator, 1-[4-(2-hydroxyethoxy)phenyl]-2-methyl-1-propan-1-one and the like can be mentioned and it is not particularly limited as long as it is water-soluble.

The contents (% by weight) of (F), (G) and (D) in the supporting material are preferably 3 to 45%, further preferably 3 to 43%, especially preferably 4 to 40% of (F) from the viewpoint of allowing the photocured product of the supporting material to remain solid and to exert the supporting strength and the viewpoint of solubility in water of the photocured product; preferably 50 to 95%, further preferably 53 to 93%, especially preferably 55 to 90% of (G) from the viewpoints of solubility in water of the photocured product and supporting strength; and preferably 0.1 to 10%, further preferably 0.3 to 8%, especially preferably 0.5 to 6% of (D) from the viewpoints of photocuring properties of the supporting material and solubility in water of the photocured product.

[Other Additive Agents (E)]

Other additive agents (E) may be incorporated into the supporting material if necessary as long as the effect of the present invention is not impaired. Those that are the same as the other additive agents (E) used for the modeling material may be used for the supporting material. Examples of (E) include a polymerization inhibitor, a coloring agent, an oxidation inhibitor, a chain transfer agent, a filler and the like. Various additive agents may be selected according to the purpose and may be used alone or in combination of two or more thereof. Each of the amounts of (E) used (%) based on the total weight of (F), (G) and (D) is the same as each of the amounts of (E) used (%) based on the total weight of (A) to (D) in the modeling material. Moreover, the total amount of (E) used (%) based on the total weight of (F), (G) and (D) is also the same as the total amount of (E) used (%) based on the total weight of (A) to (D).

[Solubility in Water of Cured Product of Supporting Material]

The solubility in water of the cured product of the supporting material may be evaluated on the basis of water dissolution time (the time required for the cured product to completely dissolve after the immersion in water) measured by the method described later. The water dissolution time is usually not more than 24 hours, and is preferably 0.1 to 20 hours, further preferably 0.1 to 12 hours from the viewpoints of supporting strength and working accuracy. The water dissolution time may be adjusted so as to fall in the above-mentioned range by selecting, with regard to the ingredients (F), (G) and (D) constituting the supporting material, the kind and amount thereof used.

[Supporting Strength of Cured Product of Supporting Material]

The supporting strength in the present invention means the ability for the cured product of the supporting material to support the cured product of the modeling material and may be represented by the durometer hardness (unit: HDA) of the cured product of the supporting material measured by the method described later. The supporting strength is preferably 17 to 35, further preferably 20 to 30 from the viewpoints of working accuracy of the photofabrication model and solubility in water of the cured product of the supporting material. The supporting strength may be adjusted so as to fall in the above-mentioned range by selecting, with regard to the ingredients (F), (G) and (D) constituting the supporting material, the kind and amount thereof used.

The supporting material according to the present invention is used as the supporting material employed for a two-pack photocurable resin composition including a combination of a modeling material for forming a photofabrication model in ink-jet three dimensional printing system and a supporting material for supporting the shape of the photofabrication model on photofabrication. Although known modeling materials may be used as the modeling material combinedly used in the two-pack photocurable resin composition, it is preferred to use the above-mentioned modeling material according to the present invention from the viewpoints of smallness of the swelling deformation due to water or moisture absorption on photocuring and after curing and excellent working accuracy and mechanical properties of the photofabrication model due to incompatibility with the supporting material.

[Production Method of Photofabrication Model]

The photofabrication model according to the present invention is usually produced by the following procedure with a photofabrication apparatus described later.

(1) Production of Two-Pack Photocurable Resin Composition

A two-pack photocurable resin composition employing a modeling material according to the present invention and a supporting material according to the present invention will be described.

(1-1) Production of Modeling Material

The curable resin ingredients (A) to (D) for a modeling material and other additive agents (E) added as needed are uniformly mixed using a mixing and stirring device or the like to produce a resin composition for a modeling material.

(1-2) Production of Supporting Material

The constituent ingredients (F), (G) and (D) for a supporting material and other additive agents (E) added as needed are uniformly mixed using a mixing and stirring device or the like to produce a resin composition for a supporting material.

(2) Production of Photofabrication Model with Three-Dimensional Modeling System

FIG. 1 is a schematic view of a three-dimensional modeling system employing an ink-jet method. As shown in FIG. 1, the system is composed of a personal computer or the like 1 and a three-dimensional modeling apparatus 2 connected to the personal computer or the like 1. The personal computer or the like 1 accepts input of three-dimensional CAD data for an object to be formed, converts the CAD data entered into to, for example, STL data as three-dimensional modeling data, and further, from the three-dimensional STL data, creates data of each layer obtained by slicing the object in the z-direction.

Specifically, in addition to data for a modeling material corresponding to a work to be formed, data for a supporting material for supporting the modeling material on forming are also created. Generally, in the case where, for example, in the z-direction, the width of the modeling material located at an upper part thereof is larger than the width of the modeling material located at a lower part thereof, namely, the work has a so-called overhang part, the system is designed so that by arranging a supporting material around the lower part in the x- and y-directions using software installed in the personal computer or the like 1, the supporting material is automatically provided and the overhang part is supported from the lower part.

Furthermore, the personal computer or the like 1 has a function of positioning and determining the posture in the x-, y- and z-directions of three-dimensional data for modeling within a modeling space possessed by the three-dimensional modeling apparatus 2, while using the STL data. More specifically, it is made possible to display, on a display screen of the personal computer or the like 1, a virtual three-dimensional space that three-dimensionally represents the modeling space above the modeling table possessed by the three-dimensional modeling apparatus 2 and to display three-dimensional STL data of the object to be formed at the default location of the space, and by using a pointing device such as a mouse and a cursor on the display screen, to determine the desired position and posture within the modeling space possessed by the three-dimensional modeling apparatus 2 using the three-dimensional STL data of the object to be formed.

The three-dimensional modeling apparatus 2 carries out the formation of each layer by receiving data of each layer obtained by slicing the object in the z-direction described above in a lump or in each layer aligned from the personal computer or the like 1, allowing two-dimensional printer heads described later possessed by the three-dimensional modeling apparatus 2 to scan in a main scanning direction (x-direction) and a vertical scanning direction (y-direction) on the basis of the data of each layer, and discharging a modeling material and a supporting material from a printer head for modeling material discharge and a printer head for supporting material discharge, respectively.

Figure 2:
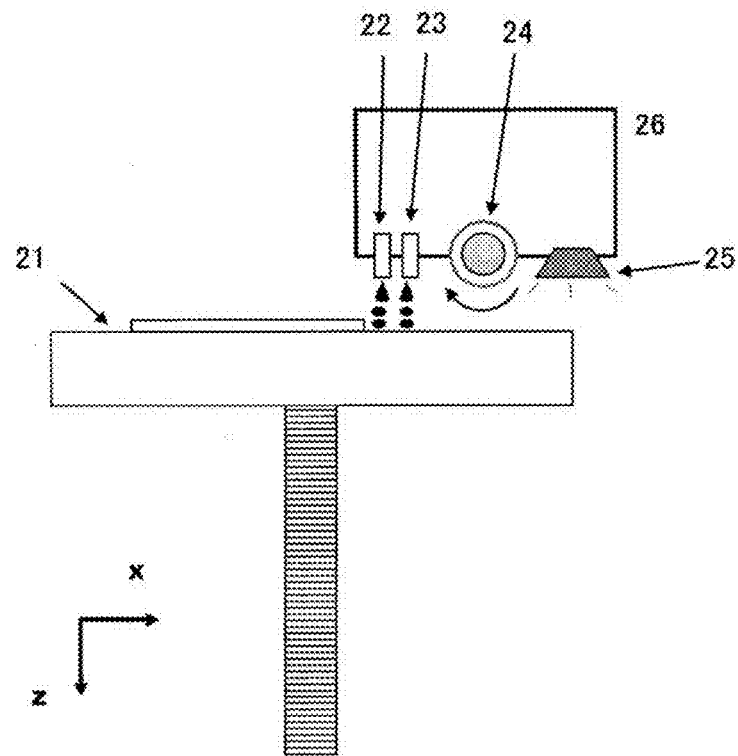
FIG. 2 is a schematic side view showing a configuration of a three-dimensional modeling apparatus.
Figure 3:
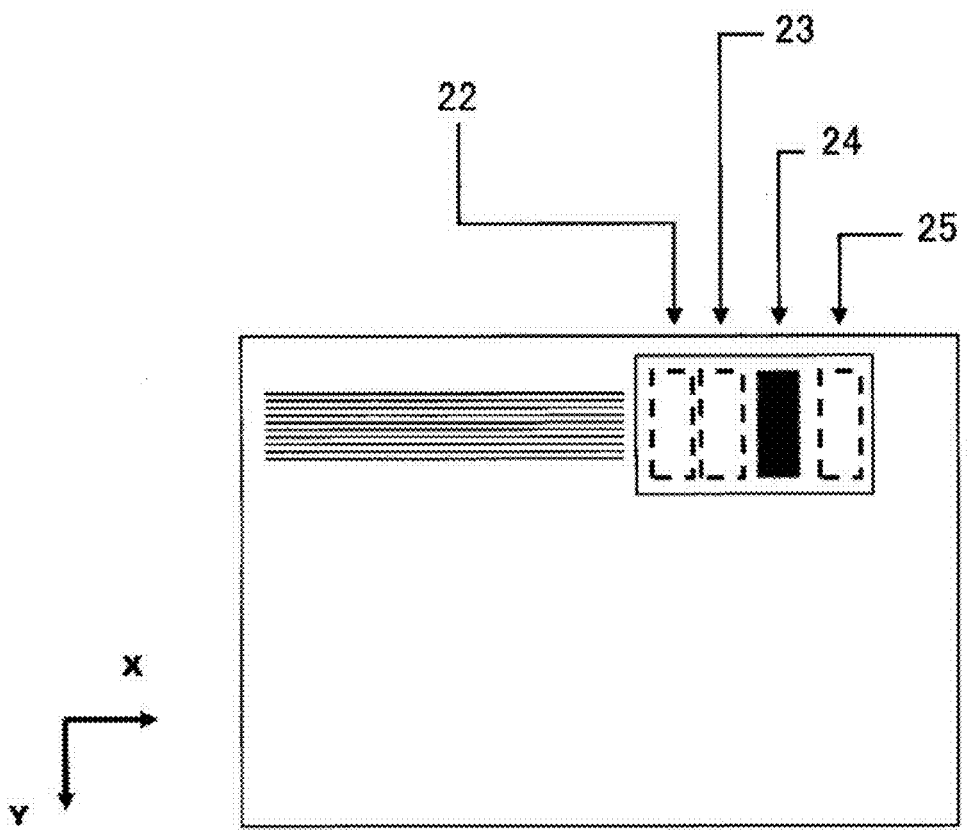
FIG. 3 is a schematic plan view showing a configuration of a three-dimensional modeling apparatus.

FIG. 2 and FIG. 3 are schematic views showing the configuration of the three-dimensional modeling apparatus 2, and FIG. 2 is a side view and FIG. 3 is a plan view. As shown in the drawings, the three-dimensional modeling apparatus 2 has a modeling table 21 which is movable in the z-direction, a printer head 22 for modeling material for discharging a modeling material onto the modeling table, a printer head 23 for supporting material for discharging a supporting material onto the modeling table, a roller 24 for removing the excess modeling material and supporting material in order to smooth the top surface of the layer formed on the modeling table 21 after discharged from the printer heads 22 and 23, and a UV light source 25 for photocuring at least the modeling material applied.

The above-described printer heads 22 and 23, the roller 24 for smoothing, and the UV light source 25 are mounted in place on a printer head module 26 and integrally driven in a main scanning direction (x-direction) and a vertical scanning direction (y-direction) above the modeling table 21 by a driving means which is not depicted.

Figure 4:
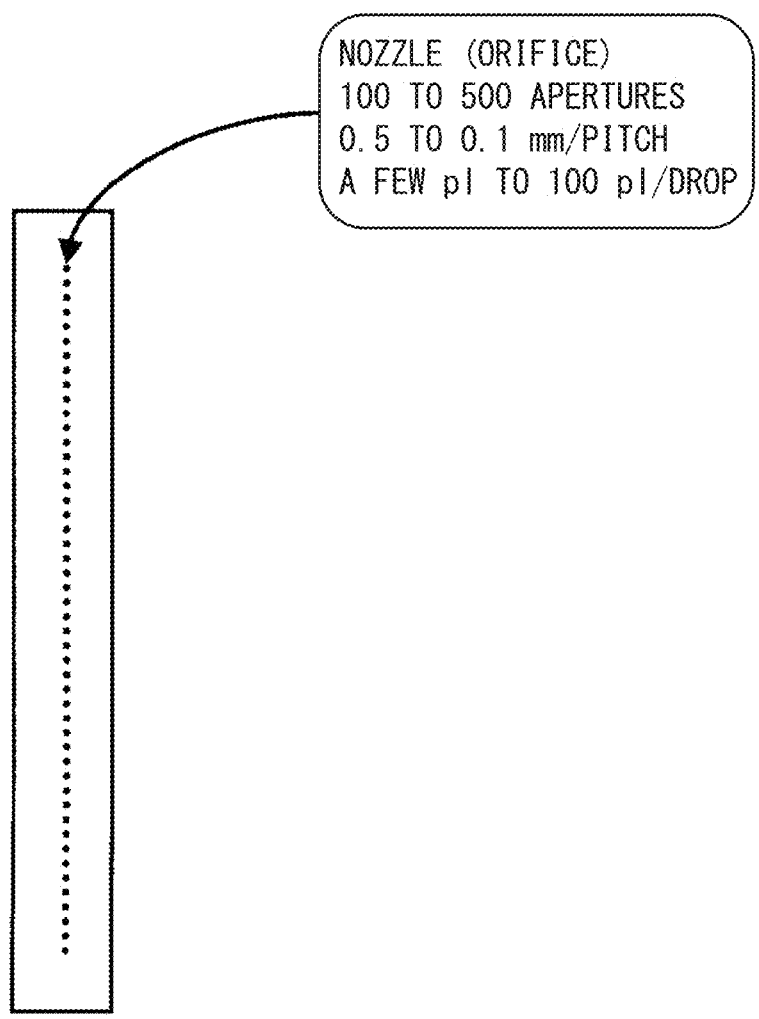
FIG. 4 is a schematic view of one of printer heads, viewed from the lower part.

FIG. 4 is a schematic view of one of printer heads 22 and 23, viewed from the lower part. As shown in FIG. 4, each of the printer heads 22 and 23 has plural orifices for discharging a modeling material or a supporting material disposed at predetermined intervals in the vertical scanning direction (y-direction) on the surface opposite to the modeling table.

In FIG. 2, when the module moves in a main scanning direction (a direction of forward movement) in which the module moves from the left side to the right side and a modeling material and a supporting material are discharged at least from the printer heads 22 and 23 onto the modeling table, the roller 24 works in the case where the module moves in a direction of backward movement in which the module moves from the right end of the main scanning direction to the left. On that occasion, the rotation direction of the roller is the direction of the arrow shown in the drawing and thus the roller revolves clockwise. In other words, it is preferred that the roller 24 be controlled so as to revolve in the same direction as the direction in which the printer head module 26 scans when the roller 24 works.

The UV light source 25 extends along the vertical scanning direction and it is desirable that the length thereof be at least as long as the length ranging over all the orifices disposed on each printer head. Moreover, as the UV light source 25, it is preferred to employ a UV lamp commonly frequently used for curing the photocurable resin or a LED. Moreover, the modeling table 21 is moved, by a driving means which is not depicted, downward (in the z-direction) by the thickness of each layer prior to the formation of the following layer every time each layer is formed on the basis of each slice data corresponding to each layer.

Figure 5:
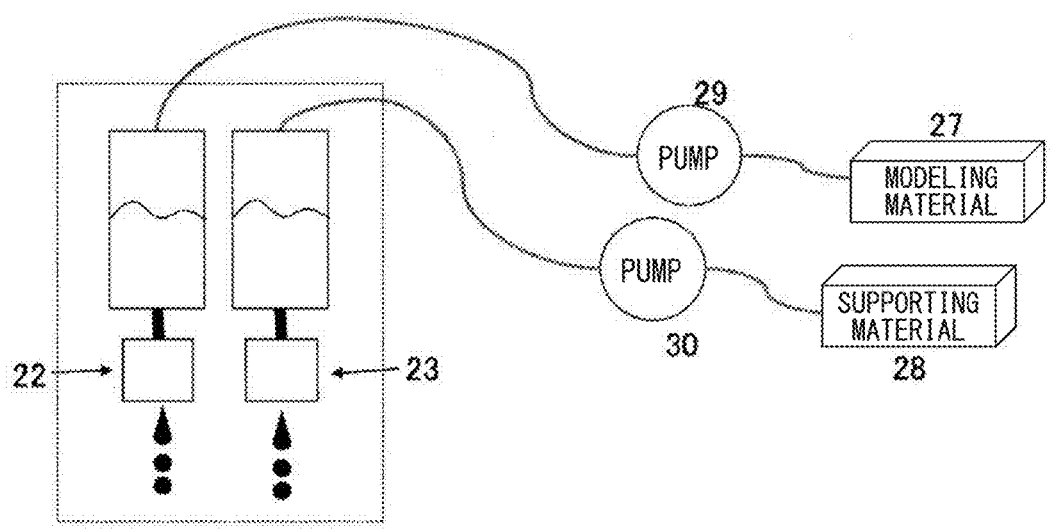
FIG. 5 is a schematic view of a materials supply system in which a modeling material and a supporting material are supplied to both printer heads respectively.

FIG. 5 is a schematic view of a materials supply system in which a modeling material and a supporting material are supplied to both printer heads 22 and 23 respectively. To each of the printer heads 22 and 23, cartridges 27 and 28 containing a modeling material and a supporting material are connected respectively and into each of the intermediate connection routes, feed pumps 29 and 30 are inserted respectively. Each of the cartridges 27 and 28 is interchangeable in the case where the modeling material or the supporting material as the contents thereof has been consumed.

Next, a three-dimensional modeling method using the above-mentioned three-dimensional modeling system employing an ink-jet method will be described. When CAD data for three-dimensional modeling are entered in the personal computer or the like 1, the data are converted to STL data and after the posture of three-dimensional data (model) within the modeling space possessed by the three-dimensional modeling apparatus 2 is determined on the display screen described above, each slice data in the z-direction is transferred to the three-dimensional modeling apparatus 2 from the personal computer or the like 1. The three-dimensional modeling apparatus 2 stacks layers, each of which corresponds to each slice data, on top of each other by allowing the printer head module 26 to move back and forth in the main scanning direction and, while allowed to move back and forth, controlling the discharge of the modeling material and the supporting material from each of the printer heads 22 and 23 onto appropriate locations on the basis of each slice data received. For each layer, at least the modeling material is discharged from the printer head 22 onto an appropriate location and, if necessary, the supporting material is also discharged from the printer head 23 onto an appropriate location to form each layer.

Furthermore, for example, when a modeling material and a supporting material are discharged from each of the printer heads 22 and 23 during the course of allowing the printer head module 26 to move in the direction from left to right in FIG. 2 (the direction of forward movement), the roller 24 continues to revolve in the above-described rotation direction during the course of allowing the module to move in the direction of backward movement (the direction from right to left in FIG. 2), while being in contact with the surfaces of the modeling material and the supporting material, in order to smooth the surface composed of the modeling material and the supporting material that have already been applied on the modeling table 21 and to remove the excess material. Then, by irradiating the surface smoothed with the roller 24 with ultraviolet rays from the UV light source 25 mounted on the printer head module 26, the layer located on the top surface of the object formed on the modeling table 21 is allowed to be cured. In this connection, it goes without saying that each layer is formed from at least the modeling material and formed by being added with the supporting material if necessary. Thus, the formation of each layer is carried out by discharging a modeling material and a supporting material from each of the printer heads 22 and 23, forming a layer located on the top surface of the object on the modeling table 21, smoothing the surface of the layer with the roller 24, and curing the layer by irradiating the layer located on the top surface of the object on the modeling table 21 with ultraviolet rays. By repeating these steps, a three-dimensional model is formed.

Figure 6:
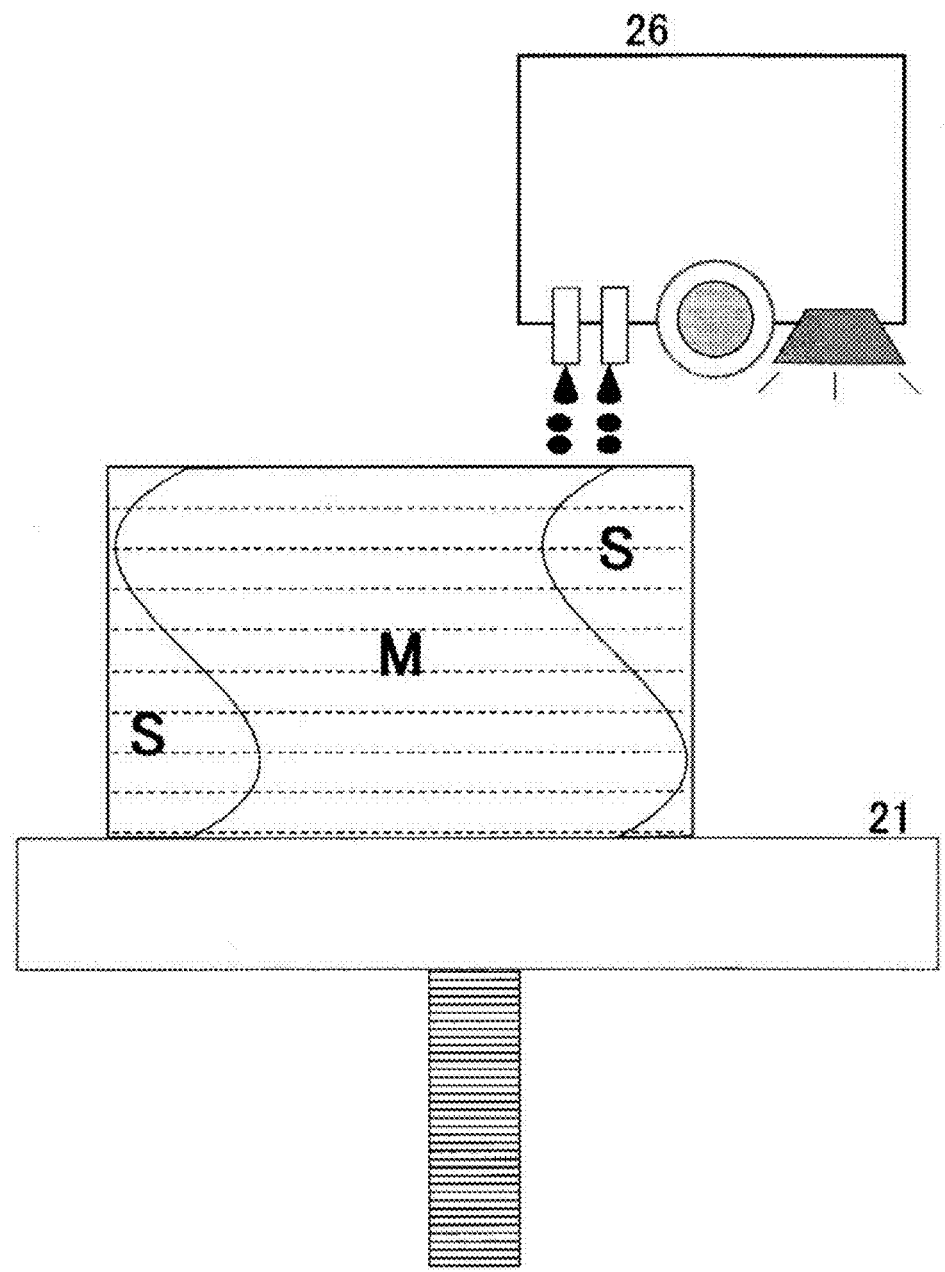
FIG. 6 is a schematic view showing the halfway state of a three-dimensional model prepared while operating a three-dimensional modeling apparatus.

FIG. 6 is a schematic view showing the halfway state of a three-dimensional model prepared while operating a three-dimensional modeling apparatus 2. The portion represented by M shown in the drawing is the portion of stacked layers formed from the modeling material and the portion represented by S is the portion of stacked layers formed from the supporting material. As described above, the model is allowed to form so that the supporting materials are deposited on the portions represented by S in order to support the curved parts at the left and right of the modeling material shown in the drawing since the modeling material of the portion represented by M has an approximately S-shape formed from the lower part to the upper part in the z-direction.

Figure 7A:
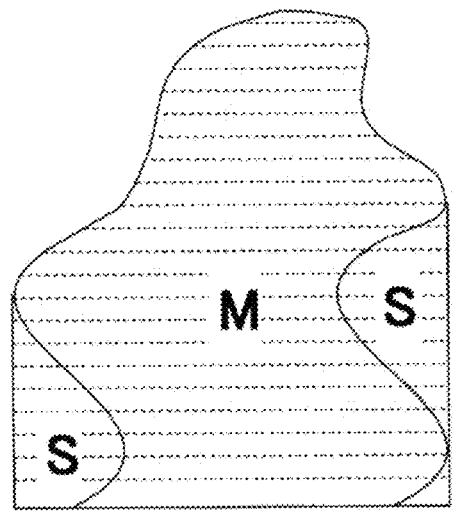
FIG. 7(A) is a schematic view showing a model accompanied by supporting materials after the completion of forming.
Figure 7B:
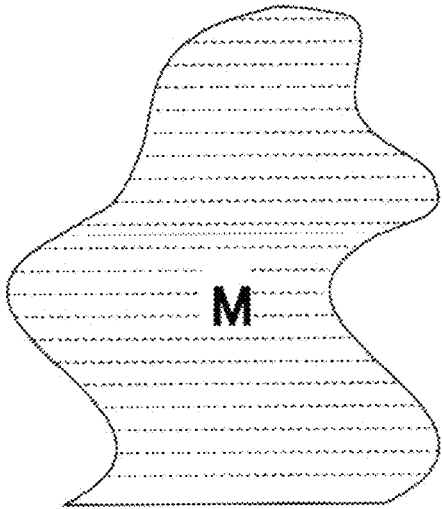
FIG. 7(B) is a schematic view showing a model obtained by removing the supporting materials from the model accompanied by the supporting materials after the completion of forming.

FIG. 7(A) is a schematic view showing a model accompanied by supporting materials after the completion of forming like this, and FIG. 7(B) is a schematic view showing a model obtained by removing supporting materials from the model accompanied by supporting materials after the completion of forming. As shown in FIG. 7(A), when the formation of the three-dimensional model using the three-dimensional modeling apparatus 2 is completed, the model and the supporting materials for supporting the modeling material on forming are still integrally formed. As such, since the supporting material is composed of the water-soluble material, for example, by immersing it in water, it is made possible to obtain a model composed only of such a modeling material shown in FIG. 7(B).

EXAMPLES

Hereinafter, the present invention will be described in more detail by reference to examples, but the present invention is not limited thereto. It should be noted that part and % refer to part by weight and % by weight respectively unless otherwise stated.

Production Example 1

In a reaction vessel were placed 100 parts of a caprolactone adduct of 2-hydroxyethyl acrylate [trade name "Placcel FA-4D", available from Daicel Chemical Industries, Ltd, number of moles added: 4], 64 parts of a nurate of IPDI [trade name "VESTANAT T1890", available from Degussa Japan Co., Ltd.], and 0.03 parts of a urethanization catalyst [bismuth tris(2-ethylhexanoate) (a 50% 2-ethylhexanoic acid solution); the same holds true for description below], and allowed to undergo a reaction for 12 hours at 80° C. to give urethane acrylate (C-1). The Mn of (C-1) was 1,730.

Production Example 2

In a reaction vessel were placed 100 parts of polytetramethylene glycol [trade name "PTMG-1000", available from Mitsubishi Chemical Corporation, Mn 1,000], 33.3 parts of IPDI and 0.05 parts of a urethanization catalyst, and allowed to undergo a reaction for 4 hours at 80° C., after which 11.6 parts of 2-hydroxyethyl acrylate (NCO/OH equivalent ratio=1/1) was added and allowed to undergo a reaction for 8 hours at 80° C. to give urethane acrylate (C-2). The Mn of (C-2) was 1,606.

Production Example 3

In a reaction vessel equipped with a stirrer were placed 28.59 parts of TDI, 0.021 parts of 2,6-di-tert-butyl-p-cresol, 0.072 parts of dibutyltin dilaurate and 0.007 parts of phenothiazine and cooled with ice until the liquid temperature became 10° C. or lower with stirring. To the mixture, 26450 parts of oxypropylene glycol with a number-average molecular weight of 1000 was added and allowed to undergo a reaction with stirring for 2 hours while controlling the liquid temperature so as to become 35° C. or lower. Next, to the mixture, 9.70 parts of 2-hydroxypropyl acrylate was added dropwise and 24.74 parts of hydroxyethyl acrylate was further added dropwise. The stirring was continued for 3 hours at a liquid temperature of 70 to 75° C. and the reaction was discontinued at the point of time at which the residual isocyanate group concentration became 0.1% or less to give urethane acrylate "UA-1". (the method of [Synthesis Example 1: Synthesis of Urethane acrylate (B)] described in Japanese Patent Laid-Open No. 2010-155926)

Examples 1-1 to 1-7 and Comparative Examples 1-1 to 1-5

By uniformly mixing raw materials so as to allow the blending composition (parts) to be the one listed in Table 1, each modeling material of examples and comparative examples was obtained. Each modeling material was evaluated in <Evaluation item 1> described later. The results are shown in Table 1. In this context, as the modeling materials in Comparative Example 1-1; Comparative Examples 1-2 and 1-3; and Comparative Example 1-4, the modeling materials described in the above-mentioned Patent Document 1 (Japanese Patent Laid-Open No. 1-204915); Patent Document 13 (Japanese Patent Laid-Open No. 2010-155926); and Patent Document 10 (EP Patent No. 1274551B1) were employed, respectively.

Examples 2-1 to 2-13 and Comparative Examples 2-1 to 2-6

By uniformly mixing raw materials so as to allow the blending composition (parts) to be the one listed in Table 2, each supporting material of examples and comparative examples was obtained. Each supporting material was evaluated in <Evaluation item 2> described later. The results are shown in Table 2. In this context, as the supporting materials in Comparative Examples 2-1 and 2-2; and Comparative Examples 2-3 and 2-4, the supporting materials described in the above-mentioned Patent Document 10 (EP Patent No. 1274551B1); and Patent Document 12 (Japanese Patent Laid-Open No. 2010-155889) were employed, respectively.

Examples 3-1 to 3-4 and Comparative Examples 3-1 to 3-3

By using a modeling material and a supporting material in combination as shown in Table 3, the relations of modeling material/supporting material were evaluated in <Evaluation item 3> described later. The results are shown in Table 3. In this context, for the modeling material/supporting material combination in comparative examples, as the combinations in Comparative Examples 3-1 and 3-2 and Comparative Example 3-3, those described in the above-mentioned Patent Document 12 and 13 and Patent Document 10 were employed, respectively.

TABLE 1

|  |  |  | sp Value | Water solubility | Examples | | | | | | | Comparative Examples | | | | |
|---|---|---|---|---|---|---|---|---|---|---|---|---|---|---|---|---|
|  |  |  |  |  | 1-1 | 1-2 | 1-3 | 1-4 | 1-5 | 1-6 | 1-7 | 1-1 | 1-2 | 1-3 | 1-4 | 1-5 |
| Blending composition (parts by weight) | A | A-1 | 9.62 |  | 70 | 75 | 60 | 60 | 80 | 50 |  | 20 | 40 |  |  |  |
|  |  | A-2 | 12.72 | ○ |  |  |  |  |  |  | 10 |  |  | 40 | 55 | 50 |
|  |  | A-3 | 11.93 | ○ |  |  |  |  |  |  |  |  |  |  |  |  |
|  |  | A-4 | 10.12 |  |  |  |  |  |  |  |  |  |  |  |  |  |
|  |  | A-5 | 9.32 |  |  |  |  |  |  |  | 18 | 10 |  |  |  |  |
|  |  | A-6 | 8.66 |  |  |  |  |  |  |  | 62 | 35 |  |  |  |  |
|  | B | B-1 | 9.92 |  | 10 | 5 | 20 | 10 | 10 | 10 | 15 | 25 |  |  |  |  |
|  |  | B-2 | 11.39 |  |  |  |  |  |  |  |  |  | 60 |  | 35 | 40 |
|  |  | B-3 | 9.72 |  |  |  |  |  |  |  |  |  |  | 50 |  |  |
|  |  | B-4 | 9.56 |  |  |  |  |  |  |  |  |  |  |  |  |  |
|  | C | C1 | 10.7 |  | 20 | 20 | 20 |  |  | 30 |  |  |  |  |  | 10 |
|  |  | C2 | 9.68 |  |  |  |  | 30 | 10 |  | 5 |  | 10 | 10 |  |  |
|  |  | UA-1 | 8.8 |  |  |  |  |  |  |  |  |  |  |  |  |  |
|  |  | C-3 | 10.7 |  |  |  |  |  |  |  |  | 10 |  |  |  |  |
|  | D | D-1 | 11.1 |  | 5 | 5 | 5 |  |  | 3 | 1 | 3 |  | 3 | 3 | 3 |
|  |  | D-2 | 12.24 |  |  |  |  | 5 | 5 | 3 |  |  | 4 |  |  |  |
|  |  | D-3 | 10.52 |  |  |  |  |  |  |  |  |  |  |  |  |  |
|  | E | E-1 |  |  |  |  |  |  | 0.1 |  |  |  |  |  |  |  |
|  |  | E-2 |  |  |  | 0.1 |  |  |  |  |  |  |  |  |  |  |
|  |  | E-3 |  |  | 0.05 |  |  |  |  |  |  |  |  |  |  |  |
| Evaluation item 1 |  | sp Value |  |  | 9.9 | 9.9 | 9.9 | 9.7 | 9.7 | 10.3 | 9.0 | 9.4 | 10.7 | 10.9 | 12.0 | 12.0 |
|  |  | Tg |  |  | 77 | 71 | 90 | 77 | 88 | 73 | 80 | 67 | 65 | 61 | 55 | 60 |
|  |  | Swelling ratio |  |  | 0.1 | 0.1 | 0.1 | 0.1 | 0.1 | 0.5 | 0.1 | 2.1 | 3.8 | 1.9 | 3.3 | 2.3 |
|  |  | Swelling deformation caused by immersion in water (mm) |  |  | 0.1 | 0.1 | 0.1 | 0.2 | 0.1 | 0.2 | 0.1 | 1.1 | 1.0 | 1.5 | 2.4 | 2.3 |
|  |  | Strength on tearing apart |  |  | 40 | 30 | 55 | 35 | 40 | 45 | 30 | 14 | 19 | 19 | 12 | 14 |
|  |  | Breaking energy (brittleness) |  |  | 4.4 | 3.5 | 3.0 | 3.0 | 3.5 | 5.0 | 3 | 1.2 | 1.8 | 1.3 | 1.1 | 1.6 |
|  |  | Deformation caused by moisture absorption (40° C. × 90% RH, 24 h) |  |  | 0.1 | 0.1 | 0.1 | 0.1 | 0.1 | 0.5 | 0.1 | 2.9 | 2.8 | 2.1 | 3.3 | 2.9 |
|  |  | Deformation during storage (40° C. × 10% RH, 24 h) |  |  | 0.1 | 0.1 | 0.1 | 0.1 | 0.2 | 0.5 | 0.1 | 2.1 | 2.5 | 2.2 | 3.5 | 3.0 |

TABLE 2

|  |  |  | Examples | | | | | | | | | |
|---|---|---|---|---|---|---|---|---|---|---|---|---|
|  |  |  | 2-1 | 2-2 | 2-3 | 2-4 | 2-5 | 2-6 | 2-7 | 2-8 | 2-8 | 2-9 | 2-10 |
| Blending composition (parts by weight) | F | F-1 | 20 | 30 | 40 | 10 | 5 | 40 |  |  |  |  |  |
|  |  | F-2 |  |  |  |  |  |  | 20 | 30 | 40 | 10 | 5 |
|  |  | F-3 |  |  |  |  |  |  |  |  |  |  |  |
|  | G | G-1 | 40 | 70 |  | 90 | 95 |  | 40 | 70 |  | 90 | 95 |
|  |  | G-2 | 40 |  | 60 |  |  |  | 40 |  | 60 |  |  |
|  |  | G-3 |  |  |  |  |  | 60 |  |  |  |  |  |
|  |  | G-4 |  |  |  |  |  |  |  |  |  |  |  |
|  |  | G-5 |  |  |  |  |  |  |  |  |  |  |  |
|  |  | G'-1 |  |  |  |  |  |  |  |  |  |  |  |
|  |  | G'-2 |  |  |  |  |  |  |  |  |  |  |  |
|  | D | D-1 |  |  |  | 3 | 5 | 3 |  |  |  | 3 | 5 | 3 |
|  |  | D-2 | 3 | 3 |  |  |  |  | 3 | 3 |  |  |  |
|  |  | D-3 |  |  |  |  |  |  |  |  |  |  |  |
|  |  | D-4 |  |  |  |  |  | 5 |  |  |  |  |  |
|  | E | E-4 |  |  |  |  |  |  |  |  |  |  |  |
|  |  | E-5 |  |  |  |  |  | 0.1 |  |  |  |  |  |
|  |  | E-6 | 0.1 |  |  |  |  |  | 0.1 |  |  |  |  |
|  | H | H-1 |  |  |  |  |  |  |  |  |  |  |  |
|  |  | H-2 |  |  |  |  |  |  |  |  |  |  |  |
| Evaluation item 2 |  | Dissolution time (h) | 2 | 3 | 5 | 1 | 0.5 | 8 | 1.5 | 2.5 | 4 | 0.8 | 0.4 |
|  |  | Ease of removal of supporting material | ○ | ○ | ○ | ○ | ○ | ○ | ○ | ○ | ○ | ○ | ○ |
|  |  | Supporting strength | ⊙ | ⊙ | ⊙ | ○ | ○ | ○ | ⊙ | ⊙ | ⊙ | ○ | ○ |

TABLE 2-continued

| | | | Examples | | | Comparative Examples | | | | | |
|---|---|---|---|---|---|---|---|---|---|---|---|
| | | | 2-11 | 2-12 | 2-13 | 2-1 | 2-2 | 2-3 | 2-4 | 2-5 | 2-6 |
| Blending composition (parts by weight) | F | F-1 | | | | | | 100 | 36.9 | 20 | 20 |
| | | F-2 | | 40 | 40 | | | | | | |
| | | F-3 | 40 | | | 40 | | | | | |
| | G | G-1 | 60 | | | | | | | | |
| | | G-2 | | | | | | | | | |
| | | G-3 | | | | | | | | | |
| | | G-4 | | 60 | | | | | | | |
| | | G-5 | | | 60 | | | | | | |
| | | G'-1 | | | | | | | 50.4 | 80 | |
| | | G'-2 | | | | 60 | 60 | | | | 80 |
| | D | D-1 | | 3 | 3 | | | | | | |
| | | D-2 | | | | | | 5 | 5 | 5 | 5 |
| | | D-3 | 5 | | | 5 | 5 | | | | |
| | | D-4 | | | | | | | | | |
| | E | E-4 | | | | | | | 0.5 | 0.5 | |
| | | E-5 | | | | | | | | | |
| | | E-6 | | | | | | | | | |
| | H | H-1 | 40 | | | | 40 | | | | |
| | | H-2 | | | | | | | 12.3 | | |
| Evaluation item 2 | Dissolution time (h) | | 1 | 2.5 | 3 | Swollen but insoluble | 48< | | 24 | 1 | 1 |
| | Ease of removal of supporting material | | ○ | ○ | ○ | X | X | X | Δ | ○ | ○ |
| | Supporting strength | | ○ | ○ | ○ | ○ | ○ | ⊙ | ○ | X | X |

TABLE 3

| | | Examples | | | | Comparative Examples | | |
|---|---|---|---|---|---|---|---|---|
| | Modeling material | 1-1 | | 1-6 | | 1-2 | 1-2 | 1-4 |
| Evaluation item 3 | sp Value | 9.87 | | 10.3 | | 10.9 | 10.9 | 10.4 |
| | Supporting material | Example 2-1 | Example 2-6 | Example 2-1 | Example 2-6 | Comparative Example 2-3 | Comparative Example 2-4 | Comparative Example 2-1 |
| | Ease of separation of modeling material and supporting material | Δ | ○ | Δ | ○ | X | X | X |
| | State of intermixed part of modeling material and supporting material (after immersion in water) | ○-Δ | ○ | ○-Δ | ○ | X | X | X |
| | Working accuracy of boundary between modeling material and supporting material | ○-Δ | ○ | ○-Δ | ○ | X | X | X |

In this connection, the contents represented by symbols in Tables 1 and 2 are as follows. A-1: isobornyl acrylate [trade name "LIGHT ACRYLATE IBXA", available from Kyoeisha Chemical Co., LTD., average number of functional groups: 1] A-2: acryloyl morpholine [trade name "ACMO", available from KOHJIN Holdings Co., LTD., average number of functional groups: 1] A-3: 2-hydroxy-3-phenoxypropyl acrylate [trade name "EPDXY ESTER M-600A", available from Kyoeisha Chemical Co., LTD., average number of functional groups: 1] A-4: phenoxyethyl acrylate [trade name "SR-339", available from Sartomer Company, Inc., average number of functional groups: 1] A-5: 1-adamantyl acrylate [trade name "1-AdA", available from Osaka Organic Chemical Industry Ltd., average number of functional groups: 1] A-6: stearyl acrylate [trade name "STA", available from Osaka Organic Chemical Industry Ltd., average number of functional groups: 1]

B-1: dicyclopentanedimethylol diacrylate [trade name "LIGHT ACRYLATE DCP-A", available from Kyoeisha Chemical Co., LTD., average number of functional groups: 2] B-2: an acrylic acid adduct of 2 mol PO modified bisphenol A adduct diglycidyl ether [trade name "EPDXY ESTER 3002A", available from Kyoeisha Chemical Co., LTD., average number of functional groups: 2] B-3: trimethylolpropane triacrylate [trade name "SR-351", available from Sartomer Company, Inc., average number of functional groups: 3] B-4: 1,6-hexanediol diacrylate [trade name "LIGHT ACRYLATE 1,6HX-A", available from Kyoeisha Chemical Co., LTD., average number of functional groups: 2]

C-3: urethane acrylate oligomer [trade name "Photomer 6010", available from Cognis Japan Ltd., average number of functional groups: 2] D-1: 1,3,5-trimethylbenzoyldiphenyl phosphine oxide [trade name "Lucirin TPO", available from BASF Japan Ltd.] D-2: 1-hydroxycyclohexylphenyl ketone [trade name "IRGACURE 184", available from Ciba Specialty Chemicals Inc.] D-3: 2-methyl-1-[4-(methylthio)phenyl]-2-morpholinopropan-1-one [trade name "IRGACURE "907", available from Ciba Specialty Chemicals Inc.] D-4: 1-[4-(2-hydroxyethoxy)phenyl]-2-methyl-1-propan-1-one [trade name "IRGACURE "2959", available from Ciba Specialty Chemicals Inc.]

E-1: polyether modified polydimethylsiloxane [trade name "BYK 307", available from BYK Japan KK] E-2: hydroquinone monomethyl ether [available from Wako Pure Chemical Industries, Ltd.] E-3: carbon black [trade name "MHI Black #220", available from Mikuni Color LTD.]

F-1: N-hydroxyethyl acrylamide [trade name "HEAA", available from KOHJIN Holdings Co., LTD., average number of functional groups: 1] F-2: acryloyl morpholine [trade name "ACMO", available from KOHJIN Holdings Co., LTD., average number of functional groups: 1] F-3: polyethylene glycol monoacrylate (Mn: approximately 336) [trade name "Bisomer PEA6", available from Cognis Japan Ltd., average number of functional groups: 1] G-1: PPG (Mn: approximately 400) [trade name "SANNIX PP-400", available from Sanyo Chemical Industries, Ltd.] G-2: PPG (Mn: approximately 1000) [trade name "SANNIX PP-1000", available from Sanyo Chemical Industries, Ltd.] G-3: water G-4: polyoxyethylene polyoxypropylene glycol (Mn: approximately 2000) [trade name "NEWPOL PE-61", available from Sanyo Chemical Industries, Ltd.] G-5: polyoxypropylene glyceryl ether (Mn: approximately 1500) [trade name "SANNIX GP-1500", available from Sanyo Chemical Industries, Ltd.] G'-1: propylene glycol [available from Wako Pure Chemical Industries, Ltd.] G'-2: PEG (Mn: approximately 400) [trade name "PEG-400", available from Sanyo Chemical Industries, Ltd.]

E-4: 2,4-diphenyl-4-methyl-pentene [available from Wako Pure Chemical Industries, Ltd.] E-5: diphosphorous acid [available from Wako Pure Chemical Industries, Ltd.] E-6: phenothiazine [available from Wako Pure Chemical Industries, Ltd.]

H-1: polyethylene glycol diacrylate (Mn: approximately 600) [trade name "SR-610", available from Sartomer Company, Inc., average number of functional groups: 2] H-2: polyethylene glycol diacrylate (Mn: 1000) [trade name "SR-740A", available from Sartomer Company, Inc., average number of functional groups: 3]

[1] Evaluation Method of Modeling Material

A 10-cm by 10-cm square area was separated by means of spacers of 1 mm in thickness arranged as four sides on the top surface of a glass plate [trade name "GLASS PLATE", available from AS ONE CO., LTD., 200-mm by 200-mm by 5 mm thickness]. Into the square area, each of resin compositions (modeling materials) shown in Table 1 was poured, after which another glass plate was overlapped. After irradiated with ultraviolet rays of 300 mJ/cm$^2$ with an ultraviolet irradiation device [model number "ECS301G1", available from EYE GRAPHICS CO., LTD., the same holds true for description below.], the cured product was removed from the glass plate and cut into pieces of 5 mm width by 50 mm length by a cutter to obtain test specimens of the molded product. The performance evaluation of the test specimen was carried out by the following method. The results are shown by the average of values obtained from five test specimens.

<Evaluation Item 1> (1) Glass Transition Point (Tg) (° C.)

The glass transition point was measured at 10 Hz by a DMA method using a stretch mode with a dynamic viscoelasticity measuring apparatus (DMA) [model number "Rheogel-E4000", available from UBM CO., LTD.].

(2) Water-Swelling Ratio (%)

The water-swelling ratio was measured in accordance with the water absorption measuring method of ASTM D570. The swelling ratio (%) was determined by the following equation. Here, ion-exchanged water was employed as the water and the measurement was carried out at 25° C.

Water-swelling ratio (%)=100×(weight after immersion in water−weight before immersion in water)/(weight before immersion in water)

(3) Swelling Deformation Caused by Immersion in Water (mm)

A test specimen was immersed in water in the same manner as in the above-mentioned (2). The test specimen was horizontally laid on a table immediately after removed from the water, and the maximum distance (mm) between the end of the test specimen with a warpage and the surface of the table was measured and defined as the swelling deformation caused by immersion in water.

(4) Strength on Tearing Apart (N/mm$^2$)

The tensile strength on tearing apart was measured in accordance with JIS K7113 by stretching a test specimen at a test rate of 50 mm/minute with Autograph [available from Shimadzu Corp.] and defined as the strength on tearing apart.

(5) Breaking Energy (Brittleness) (J)

The energy applied until tearing apart on measurement of the above-mentioned (4) was determined from the area of the stress-strain curve until tearing apart and defined as the breaking energy. The larger the breaking energy is, the more excellent in toughness the test specimen is, and the smaller the breaking energy is, the brittler the test specimen is.

(6) Deformation Caused by Moisture Absorption (mm)

One end in the direction of the length of a test specimen was fixed to a chuck (distance for a grasp: 5 mm) and allowed to settle for 24 hours in a thermohygrostat (40° C., 90% RH) in a state of being fixed horizontally, after which the distance between the other end of the test specimen, which is at opposite side of the fixed end and allowed to be deformed to sag because of gravity, and the initial horizontal plane was measured and defined as the deformation caused by moisture absorption (mm).

(7) Deformation During Storage (mm)

A test specimen was allowed to settle for 24 hours in a thermohygrostat (40° C., 10% RH) in a state of being fixed horizontally in the same manner as in the above-mentioned (6), after which the distance between the other end of the test specimen, which is at opposite side of the fixed end and allowed to be deformed to sag because of gravity, and the initial horizontal plane was measured and defined as the deformation during storage (mm).

[2] Evaluation Method of Supporting Material
<Evaluation Item 2> (1) Water Dissolution Time (h)

On the upper surface of a microscope slide [trade name "MICRO SLIDE GLASS S1225", available from Matsunami Glass Ind., Ltd., 76-mm by 26-mm by 1.2 to 1.5 mm thickness, the same holds true for description below], 1 g of each of resin compositions (supporting materials) shown in Table 2 was placed and irradiated with ultraviolet rays of 300 mJ/cm$^2$ with an ultraviolet irradiation device to obtain a cured product. The water dissolution time of the cured product was measured by the following method (evaluation of solubility in water). In a 100-ml beaker was placed 100 ml of ion-exchanged water and in this was immersed the cured product. The cured product was visually observed every 1 hour and the time required for the cured product to completely dissolve after the start of immersion was defined as the water dissolution time.

(2) Ease of Removal of Supporting Material

A silicone rubber stopper [trade name "Silicone rubber stopper No. 1", available from TERAOKA CORPORATION, 16 mm in upper diameter, 12 mm in lower diameter, 19 mm in height] was subjected to a drilling operation to contain a hole of 4 mm in diameter that pierces the central part lengthwise, and placed on a microscope slide so that the hole faced upward. A supporting material was poured into the hole and the hole was filled with the material. The supporting material was irradiated with ultraviolet rays of 1000 mJ/cm$^2$ with an ultraviolet irradiation device to obtain a cured product. Next, in 100 ml of ion-exchanged water contained in a beaker, the cured product accompanied by the silicone rubber stopper was immersed. After 24 hours, the silicone rubber stopper was removed and the ease of removal of supporting material was evaluated according to the following criteria.

<Evaluation Criteria> ◯: The ease of removal of supporting material is good. (The hole is completely pierced.) Δ: The ease of removal of supporting material is insufficient. (There is a portion where the hole is not pierced.) x: The ease of removal of supporting material is poor. (The hole is clogged with the cured product that has swelled.)

(3) Supporting Strength (HDA Hardness)

The supporting strength means the ability for the cured product of the supporting material to support the cured product of the modeling material and was evaluated on the basis of the type A durometer hardness in accordance with JIS K7215. The specimen for evaluation was prepared in the following manner and the hardness measurement was carried out by using the specimen of approximately 5 mm in thickness. A 3-cm by 3-cm square area was separated by means of spacers of 5 mm in thickness arranged as four sides on the top surface of a glass plate [trade name "GLASS PLATE", available from AS ONE CO., LTD., 200-mm by 200-mm by 5 mm thickness]. Into the square area, a resin composition shown in Table 1 was poured, after which another glass plate was overlapped so as to keep the air out (in the case where the air was admitted, the glass plate was inclined to exclude the air). After irradiated with ultraviolet rays of 1,000 mJ/cm$^2$ with an ultraviolet irradiation device, the cured product was removed from the glass plate to obtain the molded product.

<Evaluation Criteria> ⊙: The supporting strength is sufficient. (HDA of 25 to less than 36) ◯: The supporting strength is adequate. (HDA of 17 to less than 25) Δ: The supporting strength is insufficient. (HDA of 10 to less than 17) x: The supporting strength is poor. (HDA of less than 10) When the HDA is not less than 36, the ease of removal of supporting material deteriorates.

[3] Evaluation Method of Relations of Modeling Material/Supporting Material

<Evaluation Item 3> (1) Ease of Separation of Modeling Material/Supporting Material In a 10-ml graduated cylinder [trade name "TPX graduated cylinder", available from TERAOKA CORPORATION], 3 g of a resin composition as the supporting material shown in Table 2 (one kind among Examples 2-1 to 2-13 and Comparative Examples 2-1 to 2-6) was placed. On the supporting material, 3 g of a resin composition as the modeling material shown in Table 1 (one kind among Examples 1-1 to 1-7 and Comparative Examples 1-1 to 1-5) was gently placed so as not to intermix with the supporting material. The whole graduated cylinder was wrapped with aluminum foil so as to keep the light out and the visual appearance after standing for 24 hours was observed. The ease of separation of the modeling material and the supporting material was evaluated according to the following criteria.

<Evaluation Criteria> ⊙: The ease of separation is good. (The modeling material and the supporting material separate completely at the interface therebetween.) ◯: The ease of separation is adequate. (The modeling material and the supporting material separate substantially at the interface therebetween.) Δ: The ease of separation is insufficient. (The modeling material and the supporting material separate but the interface is in the compatibilized state and is milky.) x: The ease of separation is poor. (The modeling material and the supporting material are totally in the compatibilized state and is milky.)

(2) State of Contact Part of Modeling Material/Supporting Material (After Immersion in Water)

On the upper surface of a microscope slide, a modeling material and a supporting material were combinedly placed in portions of 1 g each so that resin compositions were adjacent to and brought into contact with each other, and irradiated with ultraviolet rays of 300 mJ/cm$^2$ with an ultraviolet irradiation device to obtain a cured product. Next, in 100 ml of ion-exchanged water contained in a beaker, the cured product accompanied by the microscope slide was immersed. After 24 hours, the cured product was removed and the state of the cured product surface of the modeling material with which the supporting material had been brought into contact was evaluated according to the following criteria.

<Evaluation Criteria> ◯: The surface is the same condition as that of a cured product obtained by curing a modeling material by itself. (The cured product of the supporting material does not remain on the surface with which the supporting material has been brought into contact.) Δ: The surface is somewhat sticky. (Small amounts of the cured product of the supporting material remain on the surface with which the supporting material has been brought into contact.) x: The surface is swollen in a gel-like state. (Large amounts of the cured product of the supporting material remain on the surface with which the supporting material has been brought into contact. The modeling material and the supporting material intermix.)

(3) Working Accuracy of Boundary of Modeling Material/Supporting Material

A cured product was prepared in the same manner as in the above-mentioned <Evaluation item 3> (2) except that shortly before irradiation with an ultraviolet irradiation device, a needle (1.0 mm in diameter) was stuck perpendicularly into the modeling material and the tip of the needle was allowed to reach the glass surface, after which keeping the state of the needle unchanged, the needle was horizontally transferred to the side of the supporting material to prepare a part of the modeling material extending thinly into the supporting material. The irradiation of ultraviolet rays was immediately carried out under such conditions and the resulting cured product was immersed in ion-exchanged water in the same manner as in the above-mentioned <Evaluation item 3> (2). After 24 hours, the cured product was removed and the state of the boundary between the modeling material and the supporting material was evaluated according to the following criteria.

<Evaluation Criteria> ◯: The working accuracy of the boundary is good. (Almost all the thinly extended part of the modeling material is cured and still remains.) Δ: The working accuracy of the boundary is somewhat poor. [Only the root part of the thinly extended part of the modeling material (area of cross section of approximately 1 mm$^2$) is cured and remains.] x: The working accuracy is poor. (The thinly extended part of the modeling material disappears and the extended part cannot be defined.)

The results shown in Table 1 reveal that the formed product obtained by curing the resin compositions (Examples 1-1 to 1-7) as the modeling material according to the present invention is superior to the formed product obtained by curing the resin compositions (Comparative Examples 1-1 to 1-5) as the comparative modeling material because there is little swelling deformation due to water or little deformation on drying and it is made possible to inhibit the deformation of the photofabrication product due to moisture absorption after curing of the modeling material and the like, as well as to enhance the working accuracy of the modeling material on photofabrication. The results shown in Table 2 reveal that the cured product obtained by curing the resin compositions (Examples 2-1 to 2-13) as the supporting material according to the present invention is excellent in allowing solubility in water and supporting strength to be compatible compared to the cured product obtained by curing the resin compositions (Comparative Examples 2-1 to 2-6) as the comparative supporting material. Moreover, the results shown in Table 3 reveal that the resin compositions (Examples 1-1 and 1-6) as the modeling material according to the present invention is superior to the resin compositions (Comparative Examples 1-2 and 1-4) as the comparative modeling material because the modeling material is less apt to compatibilize and does not intermix with the resin composition as the supporting material and it is made possible to inhibit the swelling deformation of the cured product, the decline in various physical properties, the variation of working accuracy, and the like until completion of curing since there is almost no intermixed part of the modeling material and the supporting material.

INDUSTRIAL APPLICABILITY

In the modeling material according to the present invention constituting a two-pack photocurable resin composition for ink-jet three dimensional printing method, there is very little swelling due to water or moisture absorption or very little deformation due to moisture absorption on photocuring and after curing, and moreover, the photocured product of the supporting material is excellent in solubility in water and is easy to remove after photofabrication, and the resulting photofabrication model is excellent in working accuracy and mechanical properties, and therefore, the two-pack photocurable resin composition can be suitably used as a material for the production of stereo models and is extremely useful.

DESCRIPTION OF REFERENCE NUMERALS

1 Personal computer (PC)
2 Three-dimensional modeling apparatus
21 Modeling table movable in z-direction
22 Printer head for modeling material
23 Printer head for supporting material
24 Roller
25 UV Light source
26 Printer head module
27 Cartridge containing modeling material
28 Cartridge containing supporting material
29 Feed pump
30 Feed pump

The invention claimed is:

1. A three-dimensional modeling method for forming a three-dimensional fabrication product using an ink-jet three dimensional printing apparatus having a printer head for modeling material for discharging a modeling material onto a modeling table, a printer head for supporting material for discharging a supporting material onto the modeling table, and a light source for curing the modeling material and the supporting material discharged onto the modeling table, the method comprising the steps of:

discharging a modeling material from the printer head for modeling material and discharging a supporting material from the printer head for supporting material for the formation of respective layers on the modeling table;

curing the modeling material and the supporting material discharged onto the modeling table by light from the light source to form the layers; and repeating the steps of the discharging and the curing to shape a three-dimensional fabrication product formed of the modeling material and the supporting material, and separating a photocured product of the supporting material from a photocured product of the modeling material to extract the photocured product of the modeling material by immersing the three-dimensional fabrication product formed of the modeling material and the supporting material in water, wherein the modeling material discharged from the printer head for modeling material comprises curable resin ingredients (A) to (C) with a weighted average of SP value of 9.0 to 10.3 and a photopolymerization initiator (D), wherein curable resin ingredient (A) is a monofunctional ethylenically unsaturated monomer (A), curable resin ingredient (B) is a polyfunctional ethylenically unsaturated monomer containing no urethane group (B), curable resin ingredient (C) is a urethane group-containing ethylenically unsaturated monomer (C), and the content of (A) is 50% to 90%, the content of (B) is 3% to 25% and the content of (C) is 5% to 35%, on the basis of the weight of the modeling material, and water-swelling ratio of a photocured product of the modeling material is not more than 1% by weight;

the supporting material discharged from the printer head for supporting material comprises a water-soluble monofunctional ethylenically unsaturated monomer (F), an alkylene oxide adduct (G) being a water-soluble compound which is compatible with the water-soluble monofunctional ethylenically unsaturated monomer (F) and is incompatible with a photocured product of (F) and/or water, and a photopolymerization initiator (D), and the content of (F) is 3% to 45% and the content of (G) is 50% to 95%, on the basis of the weight of the supporting material.

2. The three-dimensional modeling method according to claim 1, further comprising the step of removing the excess modeling material and supporting material from surfaces of the layers formed on the modeling table by means of a roller after the step of discharging the modeling material from the printer head for modeling material and discharging the supporting material from the printer head for supporting material, wherein the ink-jet three dimensional printing apparatus has the roller for removing the excess modeling material and supporting material from the surfaces of the modeling material and the supporting material discharged onto the modeling table.

3. The three-dimensional modeling method according to claim 1, wherein swelling deformation due to water of the photocured product of the modeling material is not more than 2 mm.

4. The three-dimensional modeling method according to claim 1, wherein the photocured product of the supporting material has a durometer hardness of 17 to 35 HDA as supporting strength.

5. The three-dimensional modeling method according to claim 1, wherein the monofunctional ethylenically unsaturated monomer (A) contained in the modeling material discharged from the printer head for modeling material has a weighted average of SP value of not more than 10.

6. The three-dimensional modeling method according to claim 1, wherein (D) is a water-soluble photopolymerization initiator.

7. The three-dimensional modeling method according to claim 2, wherein the printer head for modeling material, the printer head for supporting material, the roller, and the light source are mounted on a common printer head module.

8. The three-dimensional modeling method according to claim 1, wherein the polyfunctional ethylenically unsaturated monomer containing no urethane group (B) contained in the modeling material discharged from the printer head for modeling material has a weighted average of SP value of not more than 10.

9. The three-dimensional modeling method according to claim 1, wherein the urethane group-containing ethylenically unsaturated monomer (C) contained in the modeling material discharged from the printer head for modeling material has a weighted average of SP value of not more than 10.9.

10. A three-dimensional fabrication product comprising the modeling material and the supporting material produced by the three-dimensional modeling method according to claim 1.

11. A photocured product of the modeling material produced by immersing the three-dimensional fabrication product according to claim 10 in water and removing a photocured product of the supporting material.

12. The three-dimensional modeling method according to claim 1, wherein (G) is an alkylene oxide adduct having a number average molecular weight of from 100 to 5,000.

13. A three-dimensional modeling method for forming a three-dimensional fabrication product using an ink jet three dimensional printing apparatus having a printer head for modeling material for discharging a modeling material onto a modeling table, a printer head for supporting material for discharging a supporting material onto the modeling table, and a light source for curing the modeling material and the supporting material discharged onto the modeling table, the method comprising the steps of:

discharging a modeling material from the printer head for modeling material and discharging a supporting material from the printer head for supporting material for the formation of respective layers on the modeling table;

curing the modeling material and the supporting material discharged onto the modeling table by light from the light source to form the layers; and repeating the steps of the discharging and the curing to shape a three-dimensional fabrication product formed of the modeling material and the supporting material, and separating a photocured product of the supporting material from a photocured product of the modeling material to extract the photocured product of the modeling material by immersing the three-dimensional fabrication product formed of the modeling material and the supporting material in water, wherein the modeling material discharged from the printer head for modeling material comprises curable resin ingredients (A) to (C) with a weighted average of SP value of 9.0 to 10.3 and a photopolymerization initiator (D), wherein curable resin ingredient (A) is a monofunctional ethylenically unsaturated monomer (A), curable resin ingredient (B) is a polyfunctional ethylenically unsaturated monomer containing no urethane group (B), curable resin ingredient (C) is a urethane group-containing ethylenically unsaturated monomer (C), and the content of (A) is 50% to 90%, the content of (B) is 3% to 25% and the content of (C) is 5% to 35%, on the basis of the weight of the modeling material;

the supporting material discharged from the printer head for supporting material comprises a water-soluble monofunctional ethylenically unsaturated monomer (F), an alkylene oxide adduct (G) having a number average molecular weight of 100 to 5,000 and being a water-soluble compound which is compatible with the water-soluble monofunctional ethylenically unsaturated monomer (F) and is incompatible with a photocured product of (F), and a photopolymerization initiator (D), and the content of (F) is 3% to 45% and the content of (G) is 50% to 95%, on the basis of the weight of the supporting material.

14. The three-dimensional modeling method according to claim 13, wherein (G) comprises water.

* * * * *